US008346051B2

(12) United States Patent
Hoshino et al.

(10) Patent No.: US 8,346,051 B2
(45) Date of Patent: Jan. 1, 2013

(54) RECORDING APPARATUS AND RECORDING METHOD

(75) Inventors: Hiromasa Hoshino, Osaka (JP); Seiji Horita, Osaka (JP); Takayuki Nakamura, Osaka (JP); Takanori Okada, Osaka (JP); Hideaki Mita, Hyogo (JP)

(73) Assignee: Panasonic Corporation, Osaka (JP)

( * ) Notice: Subject to any disclaimer, the term of this patent is extended or adjusted under 35 U.S.C. 154(b) by 664 days.

(21) Appl. No.: 12/602,124

(22) PCT Filed: May 22, 2008

(86) PCT No.: PCT/JP2008/001286
§ 371 (c)(1),
(2), (4) Date: Nov. 27, 2009

(87) PCT Pub. No.: WO2008/146475
PCT Pub. Date: Dec. 4, 2008

(65) Prior Publication Data
US 2010/0177250 A1 Jul. 15, 2010

(30) Foreign Application Priority Data

Jun. 1, 2007 (JP) .................................. 2007-147134

(51) Int. Cl.
*H04N 5/765* (2006.01)
(52) U.S. Cl. ....................................................... 386/200
(58) Field of Classification Search .................. None
See application file for complete search history.

(56) References Cited

U.S. PATENT DOCUMENTS 6,373,803 B2    4/2002   Ando et al.
(Continued)

FOREIGN PATENT DOCUMENTS

JP    2004-533029    10/2004
(Continued)

OTHER PUBLICATIONS

International Search Report issued Jun. 24, 2008 in International (PCT) Application No. PCT/JP2008/001286.

*Primary Examiner* — Thai Tran
*Assistant Examiner* — Stephen Smith
(74) *Attorney, Agent, or Firm* — Wenderoth, Lind & Ponack, LLP

(57) ABSTRACT

A recording and reproducing apparatus (100) can record information on a recording memory (111) having a recording region where a smallest unit for erasing recorded information is a block, on a unit of a cluster that is a unit smaller than the block. The recording and reproducing apparatus (100) includes: an input unit (130) that receives a request for starting or ending recording a file; and a system control unit (101) that records a header section of the file and a data section following the header section, from the beginning of the block in the recording region, when the request for starting recording is received; and updates the header section and records the updated header section on another cluster different from the cluster on which the header section before update is recorded when the request for ending recording is received. The system control unit (101) further corrects management information indicating a connection order of information recorded on each of the clusters included by the recording medium so that the updated header section is followed by the data section, when the updated header section is recorded on the other cluster.

11 Claims, 22 Drawing Sheets

U.S. PATENT DOCUMENTS

| | | | |
|---|---|---|---|
| 6,567,307 B1 * | 5/2003 | Estakhri | 365/185.11 |
| 6,978,083 B2 | 12/2005 | Ando et al. | |
| 7,079,753 B2 | 7/2006 | Ando et al. | |
| 7,110,661 B2 | 9/2006 | Ando et al. | |
| 7,472,309 B2 * | 12/2008 | Bangalore | 714/21 |
| 7,499,930 B2 | 3/2009 | Naka et al. | |
| 7,574,118 B2 | 8/2009 | Ando et al. | |
| 7,970,987 B2 * | 6/2011 | Conley | 711/103 |
| 8,009,968 B2 | 8/2011 | Murakami et al. | |
| 2001/0014058 A1 | 8/2001 | Ando et al. | |
| 2001/0014070 A1 | 8/2001 | Ando et al. | |
| 2002/0150381 A1 | 10/2002 | Ando et al. | |
| 2003/0118320 A1 | 6/2003 | Ando et al. | |
| 2003/0214853 A1 * | 11/2003 | Hosono et al. | 365/200 |
| 2005/0165857 A1 * | 7/2005 | Naka et al. | 707/200 |
| 2005/0259954 A1 | 11/2005 | Ando et al. | |
| 2005/0286855 A1 * | 12/2005 | Saitou et al. | 386/46 |
| 2006/0072901 A1 * | 4/2006 | Ando et al. | 386/69 |
| 2006/0126948 A1 | 6/2006 | Fukuhara et al. | |
| 2006/0288027 A1 * | 12/2006 | Murakami et al. | 707/101 |
| 2007/0033374 A1 * | 2/2007 | Sinclair et al. | 711/203 |
| 2007/0094290 A1 | 4/2007 | Oka et al. | |
| 2007/0159885 A1 * | 7/2007 | Gorobets | 365/185.12 |
| 2009/0274446 A1 | 11/2009 | Ando et al. | |

FOREIGN PATENT DOCUMENTS

| | | |
|---|---|---|
| JP | 2005-4854 | 1/2005 |
| JP | 3615174 | 1/2005 |
| JP | 2005-215894 | 8/2005 |
| JP | 2006-48227 | 2/2006 |
| JP | 2006-157452 | 6/2006 |
| JP | 2006-351130 | 12/2006 |
| WO | 02/058074 | 7/2002 |

* cited by examiner

FIG. 2
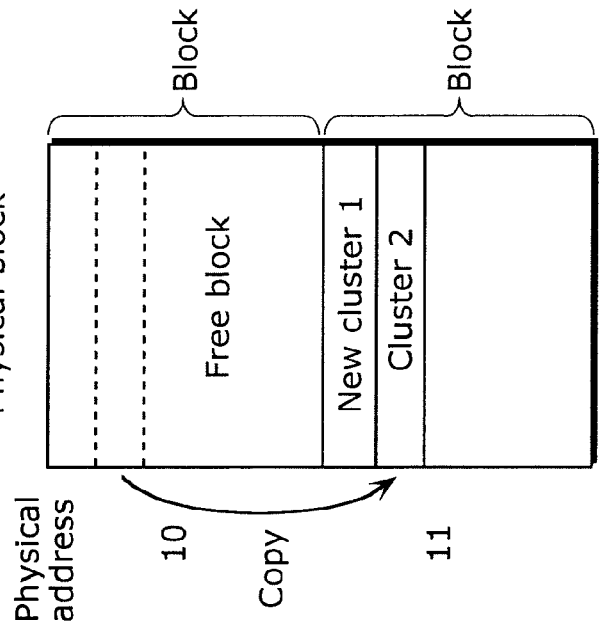
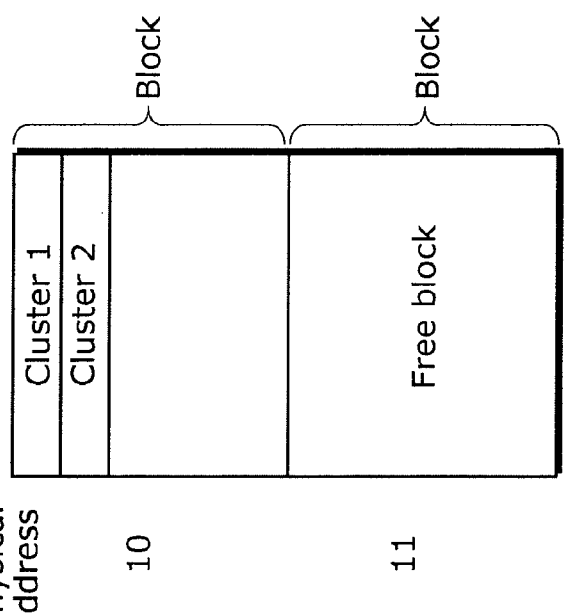

FIG. 6
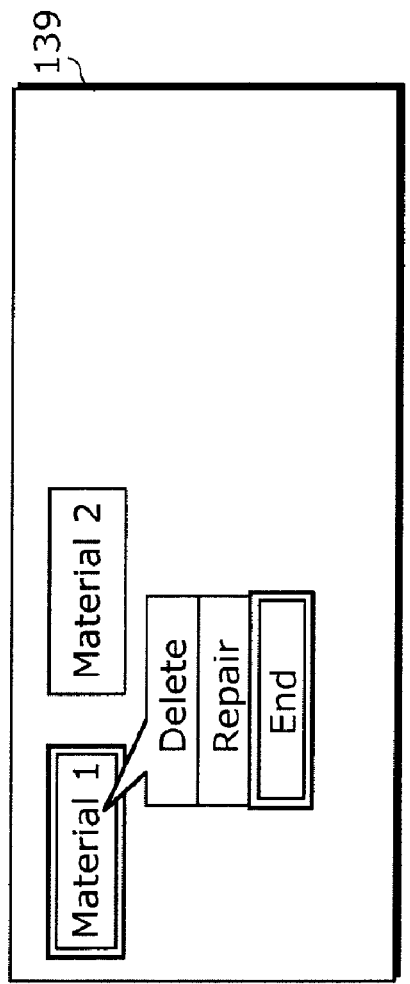
(a)
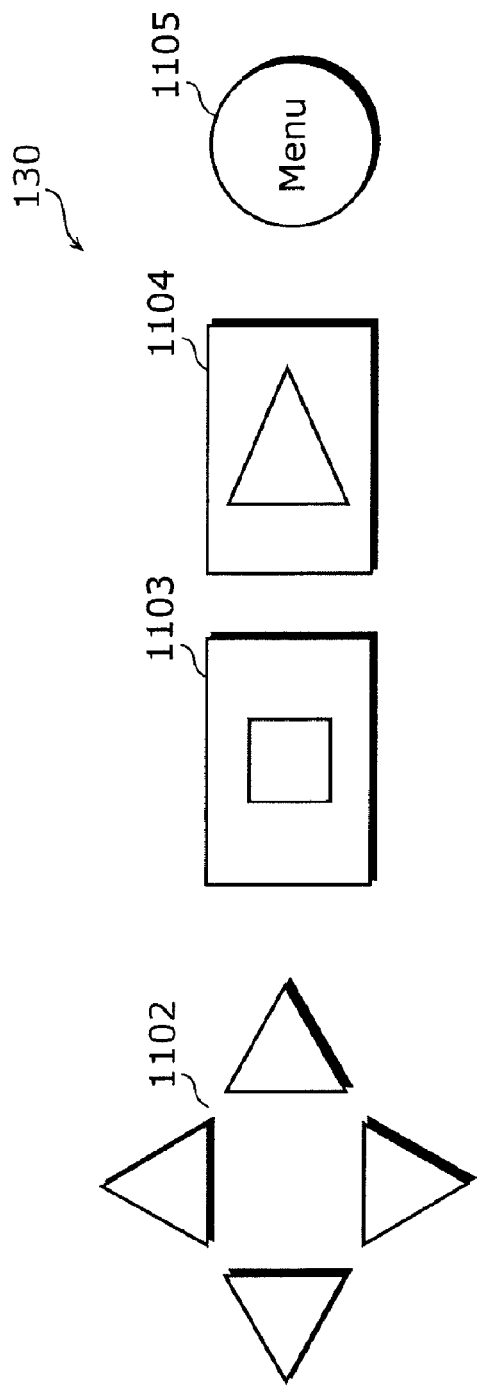
(b)

FIG. 8

| Byte position (BP) | Name | Remarks | Abbreviation |
|---|---|---|---|
| 1~3 | Reserved for system use | | |
| 4~11 | Creating system identifier | | |
| 12~13 | Number of bytes per sector | | SS |
| 14 | Number of sectors per cluster | | SC |
| 15, 16 | Number of reserved sectors | | RSC |
| 17 | Number of FATs | | FN |
| 18, 19 | Number of root directory entries | | RDE |
| 20, 21 | Number of total sectors | Equal to or less than 65535: total sectors<br>Equal to or more than 65536: 0 | TS |
| 22 | Medium identifier | | |
| 23, 24 | Number of sectors per FAT | | SF |
| 25, 26 | Number of sectors per track | | SPT |
| 27, 28 | Number of sides | | NOS |
| 29~32 | Reserved for system use | | |
| 33~36 | Number of total sectors | BP20,21 is 0: total sectors<br>Others: not specified | TS |
| 37 | Reserved for system use | | |
| 38 | Reserved | | |
| 39 | Extended boot record signature | | |
| 40~43 | Volume ID number | | |
| 44~54 | Volume label | | |
| 55~62 | File system type | | |
| 63~512 | Reserved for system use | | |

FIG. 14
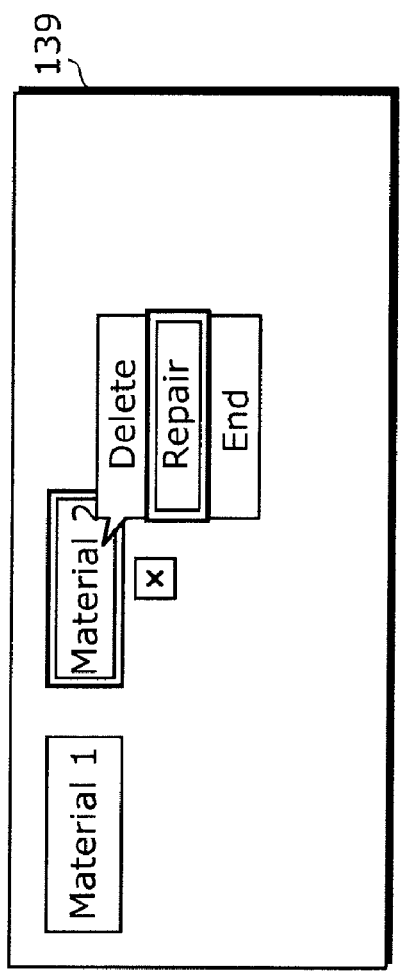
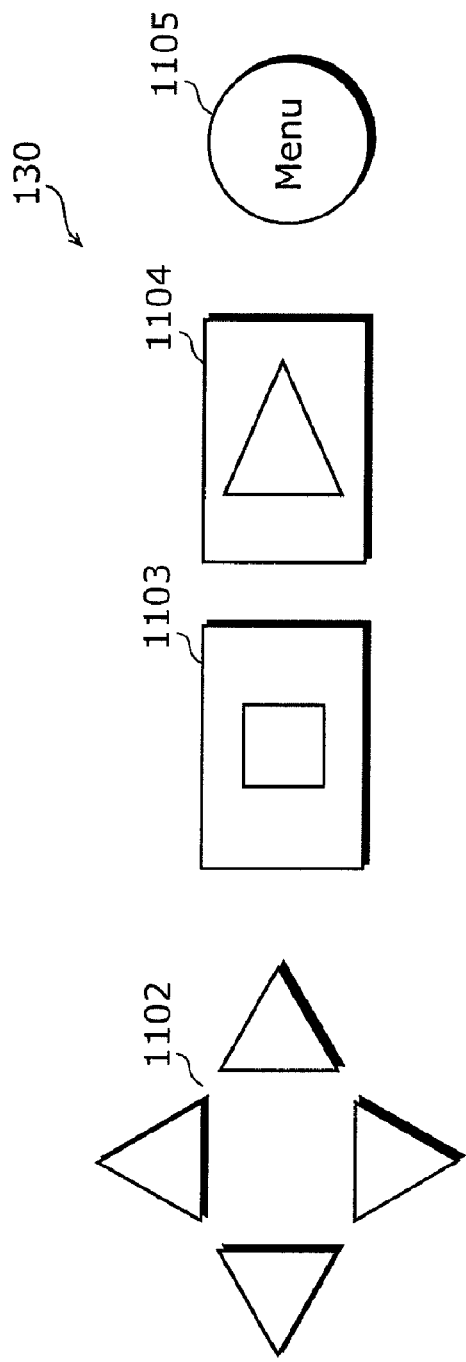

RECORDING APPARATUS AND RECORDING METHOD

TECHNICAL FIELD

The present invention relates to a technique for recording a video file and the like on a recording medium such as a flash memory.

BACKGROUND ART

Semiconductor memory cards with a nonvolatile built-in memory device have become commonly available as a recording medium for not only personal computers or digital still cameras but also digital video cameras and so on.

With the digitalization of or a development in the high definition (HD) technique for television broadcasting in recent years, larger capacity and higher speed have been required for semiconductor memory cards.

A flash memory is generally used in many semiconductor memory cards. The flash memory is a recording medium in which a block is the smallest unit for erasing. More specifically, the flash memory has a feature that a given sized data called an erase block is electrically erased collectively.

When updating data which is recorded on a recording medium in which the block is the smallest unit for erasing, and which is smaller than the block size, the following operation is carried out.

Entire data in a block including the data is once read and held, and then the data recorded in the block is erased collectively. Then, the data that has been held is partially updated and the updated data is written back to the block.

Such an operation is called a read-modify-write operation. The read-modify-write operation leads to a complicated recording operation and a lowered transmission rate in recording.

Meanwhile, it has become general, in apparatuses such as digital video cameras which record video signals and audio signals, to convert video signals and the like into a file format and record them on a recording medium.

Data format adopted for digital video cameras includes, for example, DVCPRO-HD compressed data that complies with the SMPTE370M standard, and a file format includes a MXF file that complies with the SMPTE377M.

The material exchange format (MXF) is a format used for exchanging materials and standardized by the SMPTE and enables passing data between a digital device unique to a manufacture and a digital device of other manufactures.

FIG. 1 is a diagram which shows a configuration of a video file and an audio file.

FIG. 1(a) shows a configuration of a video MXF file in the DVCPRO-HD video data format.

Compressed video data (DIF) is stored in a body of a KLV configuration following a file header. A DIF coding amount for one frame is 480,000 bytes according to the DVCPRO-HD. Accordingly, a coding amount of the body for recording N frames is N times the coding amount for one frame described above.

FIG. 1(b) shows a configuration of an audio MXF file in a waveform audio data format.

The audio data of 16 bits per one sample is stored in a body of a KLV configuration following a file header. Accordingly, the coding amount of the body at the time of recording M samples is M×2 bytes.

In addition, a type of data that has been recorded is stored in the K (Key) section of the KLV configuration, and a size of data is stored in the L (Length) section.

In the Key section of the video MXF file, the type of data and a frame frequency are stored. In the Key section of the audio MXF file, the type of data and, a sampling frequency, and the number of bits are stored.

In the case of the video file, for example, information indicating the DVCPRO-HD, the NTSC, and an interlace is stored in the Key section. In the case of the audio file, information indicating a waveform, 48 kHz, and 16 bits is stored in the Key section.

Hereinafter, the file header and the K and L sections are collectively called a header section, and the body following the K and L sections is called a data section, and the file footer is called a footer section.

As described above, the data size of the file is stored in the Length section of the header section. However, in the case where a signal stream is recorded, such as the case of a digital video camera, the data size is not determined until the end of recording.

Thus, writing into the Length section needs to be carried out at the time when recording ends. On the other hand, the header section exists at the beginning of a file, so that the header section needs to be recorded first at the time when recording starts.

For that reason, the Length section is determined as "0" and the header section is recorded prior to the data section, so that data that has been recorded halfway is restored based on the information of the header section even when the power is shut off during the recording.

In such a case, at the time of end of recording of the video and audio files, the Length section of the header section is rewritten to a correct a value. That is to say, the read-modify-write operation described above is carried out.

It is to be noted that, in sections other than the header section, the read-modify-write operation is not carried out because writing is performed by a unit of the integral multiple of the erase block.

FIG. 2 is a diagram which shows a recording method disclosed in Patent Reference 1.

Here, an example of a state of a physical block and an example of a logical and physical table is shown. As shown in FIG. 2(a), the block at a physical address 10 includes a cluster 1 and a cluster 2, and data is recorded on each of the clusters.

It is described in the logical and physical table that the block at the physical address 10 is associated with the logical address "0x240".

It is assumed here that a data writing instruction on the cluster 1 is issued. In this case, the physical block 10 including the cluster 1 also includes the cluster 2. For that reason, data of a new cluster 1 is written into a free block at the physical address 11 as shown in FIG. 2 (b).

Then, the data of the cluster 2 is copied from the physical block 10 to the physical block 11, and the physical address corresponding to the logical address "0x240" of the logical and physical table is updated from "10" to "11". Further, the data of the physical block 10 is erased to make the physical block 10 a free block.

Patent Reference 1: Japanese Unexamined Patent Application Publication No. 2006-048227

DISCLOSURE OF INVENTION

Problems that Invention is to Solve

According to the recording method disclosed by the Patent Reference 1, all data in a block is moved to a free block even when only a portion of the block is rewritten, as described above.

Accordingly, unnecessary data reading is carried out, which results in substantially the same operation as the read-modify-write operation and a problem of a lowered recording rate.

The present invention presents a solution to the above-stated problem and aims to provide a recording apparatus and a recording method that can avoid the read-modify-write operation from being carried out even when data smaller than a block size is to be rewritten.

Means to Solve the Problems

In order to achieve the object described above, a recording apparatus according to the preset invention is a recording apparatus capable of recording information on a recording medium on a cluster basis, the recording medium having a recording region in which a smallest unit for erasing recorded information is a block, and the cluster being a unit smaller than the block, the recording apparatus including: a reception unit configured to receive a request for starting recording a file and a request for ending recording the file; a recording unit configured: to record a header section of the file and a data section following the header section, from a beginning of the block in the recording region, in the case where the request for starting recording is received by the reception unit; and to update the header section and record the updated header section on an other cluster different from the cluster on which the header section before update is recorded, in the case where the request for ending recording is received by the reception unit; and a correction unit configured to correct management information indicating a connection order of information recorded on each of the clusters so that the updated header section is followed by the data section, in the case where the updated header section is recorded by the recording unit on the other cluster, the management information being included by the recording medium.

With this structure, in the case where the header section of a file smaller than a block size is updated, the updated header section is recorded on a newly secured cluster, instead of a cluster that has already been secured.

Here, in the case where the above-described processing is performed without moving the data section, an original physical positional relationship; that is, the header section is followed by the data section in the recording medium, breaks. However, correction on management information that indicates a connection order of information on a cluster basis makes it possible to maintain the original logical connection order of the file, in which the header section is followed by the data section. Therefore, the file is properly reconfigured when the file is read.

As described above, the recording apparatus according to the present invention, in the processing of updating a header section, records an updated header section on a newly secured cluster and corrects the connection order of information on a cluster basis.

This makes it possible to update the header section while avoiding unnecessary reading of information.

Therefore, in the case of recording, on a recording region in which the smallest unit of erase is a block, a file that requires updating the header section at the end of recording, the recording apparatus according to the present invention can record the file without performing a read-modify-write operation while maintaining a logical file configuration.

Further, the recording unit may be configured to record the updated header section on the other cluster included in a block different from a block on which the header section before update is recorded, in the case where the request for ending recording is received by the reception unit.

This structure makes it possible to record a file without carrying out the read-modify-write operation while complying with the content of the control even in the case where the recording operation of the recording apparatus is controlled so that accumulated data is recorded on a free block every time data for one block is accumulated on a buffer memory in order to make the recording operation less frequent.

Further, the recording unit may be configured to record the header section before update on a block in the recording region in the case where the request for starting recording is received by the reception unit, the header section before update having a size of an integral multiple of a cluster size.

This structure makes it possible to avoid reading data other than the header section even in the case where data is read on a cluster basis at the time of updating the header section.

Further, the recording unit, in the case where the recorded header section before update spans plural clusters, may be configured to record entire information recorded on the plural clusters, on plural clusters that: are different from the plural clusters over which the recorded header section before update spans; and include the other cluster, when the request for ending recording is received by the reception unit.

This structure makes it possible to record an entire header section that has been updated, on newly secured plural clusters even in the case where the header section before update spans plural clusters.

Further, the recording unit, in the case where the recorded header section before update spans plural clusters, may be configured: to read and update information only from a cluster on which a to-be-updated portion of the header section before update is recorded; and to record the updated information on the other cluster, when the request for ending recording is received by the reception unit.

This structure makes it possible, in the case where the header section before update spans plural clusters, to read and update only a part of the clusters in which the data to be updated is placed and perform recording on another cluster. Therefore, the recording operation becomes more efficient.

Further, the correction unit, in the case where the updated header section is recorded on the other cluster by the recording unit, may further be configured to deallocate the cluster on which the header section before update is recorded by correcting the management information so that the management information indicates that the cluster on which the header section before update is recorded is an unused cluster.

With this structure, the region on which the header section before update is recorded is made an unused region as a result of the updating processing. Therefore, it is possible to avoid uselessly consuming a capacity of recording medium.

Further, the management information may include a file entry having information specifying the cluster on which the header section before update is recorded, and a file allocation table (FAT) entries indicating the connection order of information, and the correction unit, when correcting the management information, may be configured to perform processing in an order of (1) securing a FAT entry corresponding to the other cluster, (2) changing the FAT entry, (3) changing the file entry, and (4) deallocating the cluster on which the header section before update is recorded.

This structure makes it possible to prevent corruption of a file and a file system. More specifically, in the case where deallocation of the cluster on which the header section before update is recorded is performed prior to any other processes, there is a possibility of file corruption such as deletion of information on the header section or deletion of information on a connection order to the next data section, when the power is shut off immediately after the deallocation.

In addition, in the case where changing the file entry is performed prior to any other processes, there is a possibility of an abnormal state where the file entry indicates a FAT entry that has not been ensured, and so on.

Therefore, the correction unit performs various processes in the above order, so that it is possible to prevent corruption of the file and the like.

Further, the recording medium may be a nonvolatile semiconductor memory medium.

Further, the recording unit, in the case where it is detected that recording medium is used up, may further be configured to update the header section before update and record the updated header section on the other cluster.

This structure makes it possible, even when the recording medium is used up, to obtain the same effective advantage as the case where a request for ending recording is received.

It should be noted that the present invention can be implemented, in addition to implementation as the recording apparatus, as a recording method including operations performed by characteristic components included by the recording apparatus as steps, and as a program which, when loaded into a computer, allows a computer to execute the steps. Further, it should be understood that the program may be distributed via recording medium such as a CD-ROM and communication medium such as the Internet.

Effects of the Invention

A recording apparatus according to the present invention makes it possible to record an updated header section on a newly secured cluster, instead of a cluster that has already been secured, even when updating the header section of a file smaller than a block size.

In addition, management information indicating a connection order of information on a cluster basis is corrected, so that an original logical connection order of the file in which the header section is followed by the data section is maintained.

The above structure makes it possible to avoid an read-modify-write operation to be carried out, and to perform recording processing at high speed.

In addition, an old header section before update is changed to be an unused region, so that it is possible to avoid uselessly consuming a capacity of semiconductor memory.

Further, there is a high possibility that the block on which an end of video and audio data is recorded includes a free space sufficient for recording a new header section.

Therefore, in the case where an operation is controlled so that accumulated data is recorded on a recording medium every time data for one block is accumulated on a buffer memory, recording a new header section on the same block as an end portion of video and audio data eliminates the need to secure a new block, making it possible to efficiently use a free region of a semiconductor memory.

BRIEF DESCRIPTION OF DRAWINGS

FIG. 2(*a*) is a first diagram which shows a recording method disclosed in the Patent Reference 1, and FIG. 2(*b*) is a second diagram which shows a recording method disclosed in the Patent Reference 1.

FIG. 6(*a*) is a diagram which shows an example of a display unit according to the embodiment, and FIG. 6(*b*) is a diagram which shows an example of an input unit according to the embodiment.

FIG. 8 is a diagram which shows information described in a boot sector of the FAT 16 file system.

FIG. 14(*a*) is a diagram which shows an example of a display unit according to the embodiment, and FIG. 14(*b*) is a diagram which shows an example of an input unit according to the embodiment.

| Numerical References | |
|---|---|
| 100 | recording and reproducing apparatus |
| 101 | system control unit |

| | Numerical References |
|---|---|
| 102 | video file processing unit |
| 103 | audio file processing unit |
| 104 | recording memory processing unit |
| 105 | file system |
| 106 | file system memory |
| 107 | recording buffer memory |
| 108 | reproducing buffer memory |
| 109 | file repairing processing unit |
| 110 | recording memory I/F unit |
| 111 | recording memory |
| 120 | I/O bus |
| 130 | input unit |
| 131 | video encoder |
| 132 | video input unit |
| 133 | video decoder |
| 134 | video output unit |
| 135 | audio encoder |
| 136 | audio input unit |
| 137 | audio decoder |
| 138 | audio output unit |
| 139 | display unit |
| 701 | File 1: file to be written into a user data region |
| 702 | directory entry of a directory on which File 1 is recorded |
| 703 | file entry of File 1 |
| 704 | FAT entry that corresponds to Ath cluster |
| 750 | FAT entry that corresponds to Bth cluster |
| 706 | FAT entry that corresponds to Cth cluster |
| 707 | FAT entry that corresponds to Dth cluster |
| 1102 | arrow key |
| 1103 | stop button |
| 1104 | reproduction button |
| 1105 | menu button |

BEST MODE FOR CARRYING OUT THE INVENTION

An embodiment according to the present invention will be described below with reference to the drawings. It is to be noted that the same numerals are applied to substantially the same elements.

First, the outline of the present invention will be described.

The recording method disclosed in Patent Reference 1 described above adopts, when updating data recorded on a cluster, a method of moving, to a free block, all data in a block including the cluster. This can be described as a technique characterized in a hierarchy of a flash memory.

On the other hand, according to the present invention, when updating a header section recorded on a cluster, only an updated header section is written (recorded) into a free cluster and file management information (described later) is corrected for consistency. In other words, the technique according to the present invention is a technique characterized in a hierarchy of a file system.

The following will describe in detail an embodiment of the present invention.

Figure 3:
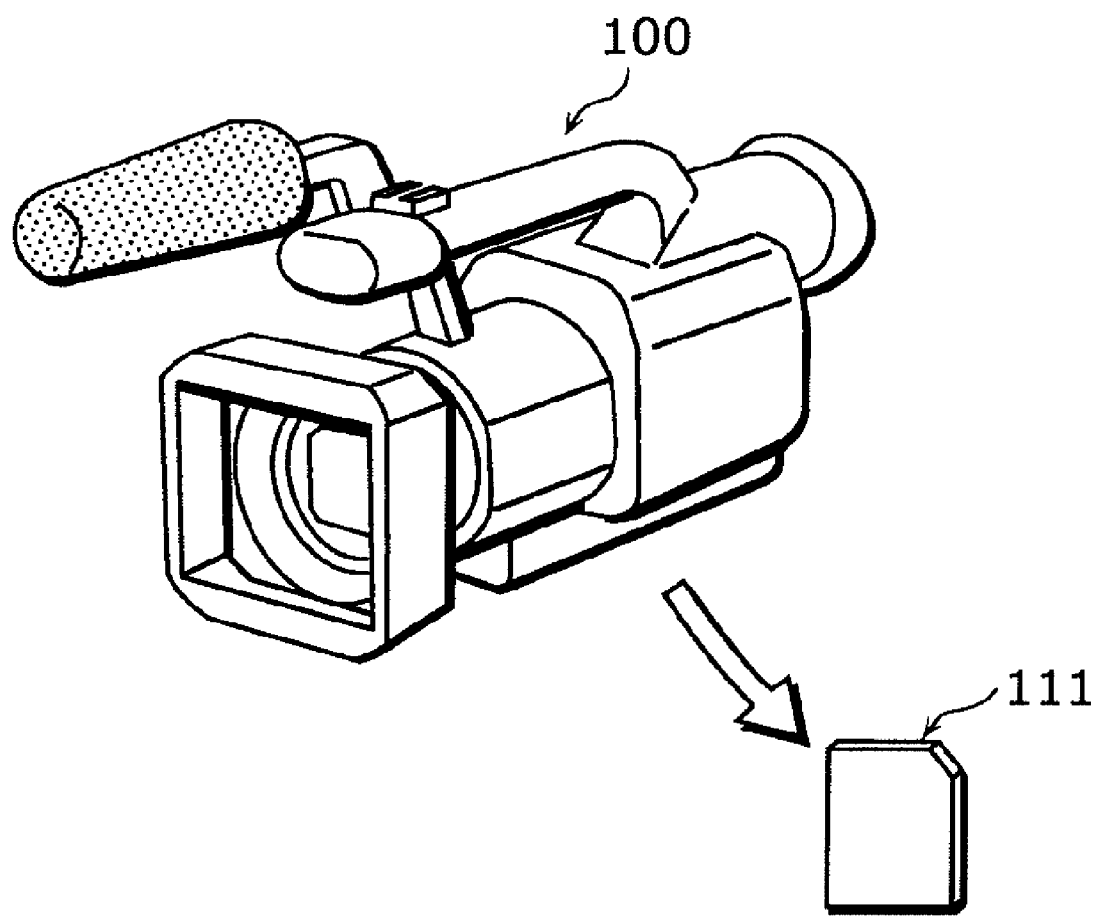
FIG. 3 is an overview of a recording and reproducing apparatus according to an embodiment.

FIG. 3 is an overview of a recording and reproducing apparatus 100 according to an embodiment of the present invention. Here, a digital video camera which records a video signal and an audio signal is illustrated as an example for the recording and reproducing apparatus 100. The digital video camera is provided with a removable recording memory 111. The digital video camera can convert a video signal and the like into a file format and record them on a recording memory 111 that is a recording medium.

Figure 4:
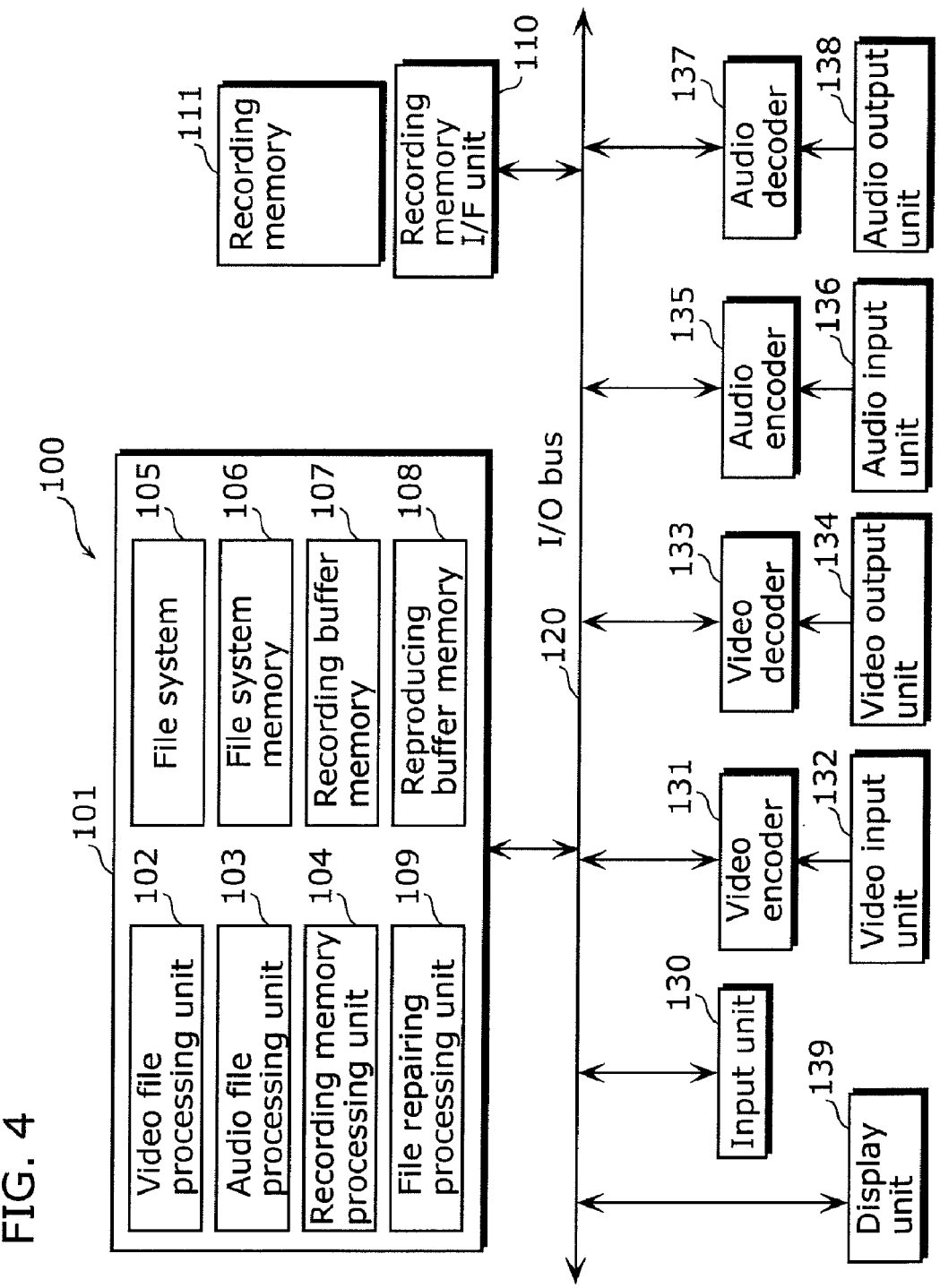
FIG. 4 is a diagram which shows a configuration of a video recording and reproducing apparatus according to the embodiment.

FIG. 4 is a diagram which shows a configuration of the recording and reproducing apparatus 100 according to the embodiment of the present invention. The recording and reproducing apparatus 100 is an example of the recording apparatus according to the present invention.

The recording and reproducing apparatus 100 includes: a system control unit 101; an I/O bus 120; a removable recording memory 111; a recording memory I/F unit 110 that connects with the recording memory 111; an input unit 130 that accepts an instruction of recording or reproducing a file from a user; a display unit 139 that displays a state of recording and reproducing or a condition of a material; a video input unit 132 that inputs a video signal; a video encoder 131 that codes a video signal; a video decoder 133 that decodes a video signal; a video output unit 134 that outputs a video signal that has been decoded; an audio input unit 136 that inputs an audio signal; an audio encoder 135 that codes an audio signal; an audio decoder 137 that decodes an audio signal; and an audio output unit 138 that outputs an audio signal that has been decoded.

The system control unit 101 is an example of a recording unit and a correction unit according to the present invention, and implemented by, for example, a computer that includes a CPU and a memory.

The system control unit 101 includes: a video file processing unit 102; an audio file processing unit 103; a recording memory processing unit 104; a file system 105; a file system memory 106; a recording buffer memory 107; a reproducing buffer memory 108; and a file repairing processing unit 109.

Functions of each processing unit included in the system control unit 101 are implemented through execution of various programs by the CPU. In addition, an embodiment of each memory included in the system control unit 101 is not limited. For example, each memory may be used for a corresponding purpose, or a single memory may be divided to be used for each purpose.

The video encoder 131 performs compression processing on a video signal inputted from the video input unit 132, for each video frame, and outputs DVCPRO-HD compressed data that complies with the SMPTE-370M standard.

The video file processing unit 102 converts, on a basis of one frame unit, compressed data that complies with the SMPTE-370M that has been compressed, to a MXF file that complies with the SMPTE-377M.

Figure 1:
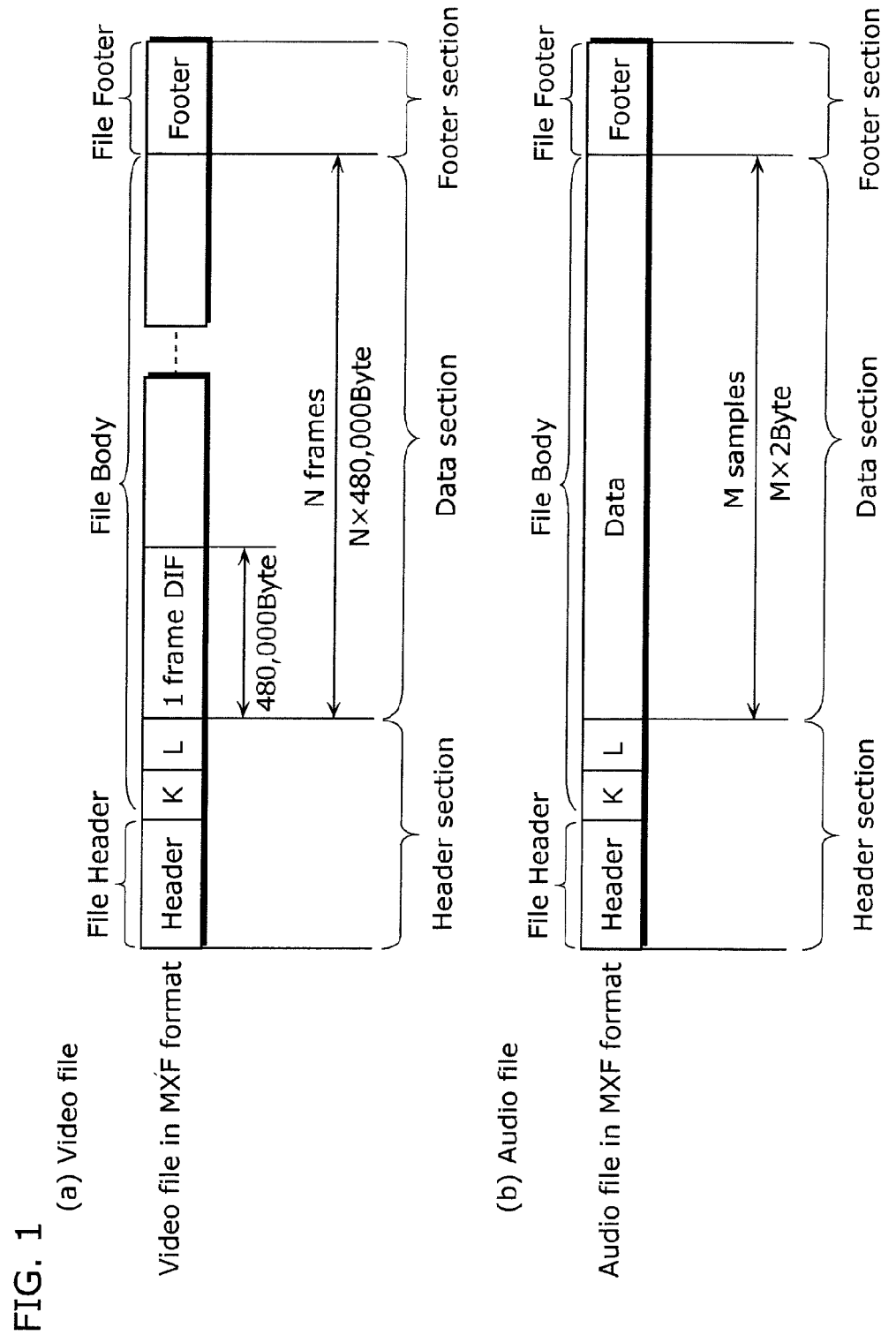
FIG. 1(*a*) is a diagram which shows a configuration of a video file, and FIG. 1(*b*) is a diagram which shows a configuration of an audio file.

The configuration of the video MXF file is as shown in FIG. 1(a). More specifically, compressed video data (DIF) is stored in the body of the KLV configuration following the file header. Since the DIF coding amount for one frame is 480,000 bytes in the DVCPRO-HD, the coding amount for the body when recording N frames becomes N times the coding amount for the above-described one frame.

It is to be noted that, although eight audio channels can be stored in data of the DIF configuration, the present embodiment does not use audio data in DIF data and records as a different data file. This is because, in most editing works for a commercial purpose, such as those in a broadcasting station, videos and audios are edited independently, and a non-linear editing device for a commercial purpose generally separates a video file from an audio file.

An audio data inputted from the audio input unit 136 is converted to a MXF file that complies with the SMPTE-377M by the audio file processing unit 103.

The configuration of the audio MXF file is as shown in FIG. 1(b). More specifically, the audio data of 16 bits per one sample is stored in the body of the KLV configuration following the file header. Accordingly, the coding amount of the body for recording M samples is M×2 bytes.

Further, a type of data that has been recorded is stored in the K (Key) section of the KLV configuration, and a size of data is stored in the L (Length) section.

In addition, the audio file is recorded independently for each channel. Therefore, in the case where an audio to be recorded has two channels, two MXF files that are independent for each channel are recorded.

The recording memory 111 is removable in a form of the PCMCIA, for example. In this case, the recording memory I/F unit 110 is assumed to comply with a card bus standard. The recording memory 111 is inserted into a card slot that is a recording medium attaching unit provided in the recording and reproducing apparatus 100, thereby being connected to the recording memory I/F unit 110.

The recording memory 111 includes two types of recording regions having a property different from each other, such as a flush memory and a magnetoresistive random access memory (MRAM). The recording memory 111 further includes a first region in a MRAM region, which is suitable to updating small-sized data and a second region in a flash memory region, which is suitable to updating large-sized data. In addition, file management information, such as file allocation tables (FAT) or a directory entry, is allocated in the first region.

It is to be noted that, the recording memory 111 is an example of the recording medium on which the recording apparatus according to the present invention writes information and the like.

The recording memory 111 is formatted in a file system of the FAT 16 and the like. The file system 105 in the system control unit 101 writes a file on the recording memory 111 through update of the file management information and data writing operation on the recording memory 111.

It is to be noted that, the above-described processing performed by the file system 105 is implemented through execution, by the CPU, of software that manages reading and writing of a file for the recording memory 111.

According to the present embodiment, it is assumed that the recording memory 111 has a sector size of 512 bytes and a cluster size of 32 KB, the first region has a recording block size of 32 KB, and the second region has a recording block size of 1 MB. The amount of space of the recording memory 111 is recognized by the recording memory processing unit 104 via the file system 105.

It is to be noted that, the "recording block" in the second region as described above is the smallest unit of erase as well, and thus it is also referred to as "erase block".

The input unit 130 is an example of a reception unit according to the present invention. More specifically, recording operations for a video and an audio are performed according to an instruction from the input unit 130. Recording operations according to the present invention will be described in detail later, and the outline thereof will be described here.

First, in the case where an instruction of starting recording is received, the file system 105 opens one video MXF file that records a video and two audio MXF files that record an audio, and records data on the recording memory 111.

It is to be noted that, although data is recorded on the header section of the video MXF file and the audio MXF file, the value to be stored in the Length section is set as "0" because the value is not determined until the end of recording.

With this, the file can be repaired because the file information is stored in the header section, even in the case where the power is shut off during recording. A file repairing method will be described in detail later.

Next, data of each file is recorded with the video and audio at the time of receiving the instruction from the input unit 130 being at the beginning. By setting the same time at the beginning of data in a file as described above, it is possible to synchronize the video file and the audio file using a frame size of the video, a frame frequency, a sampling frequency of the audio, the length of time that has elapsed from the beginning of the file, and the like.

Further, writing of data on the recording memory 111 ends in the case where an instruction of stopping recording operation is received, a processing of recording the header section and the footer section in each of the files is performed, and the file is closed.

By performing the series of recording operations, one video MXF file and two audio MXF files are newly generated. The one video MXF file and two audio MXF files which have been generated as described above are managed as a single material.

Figure 5:
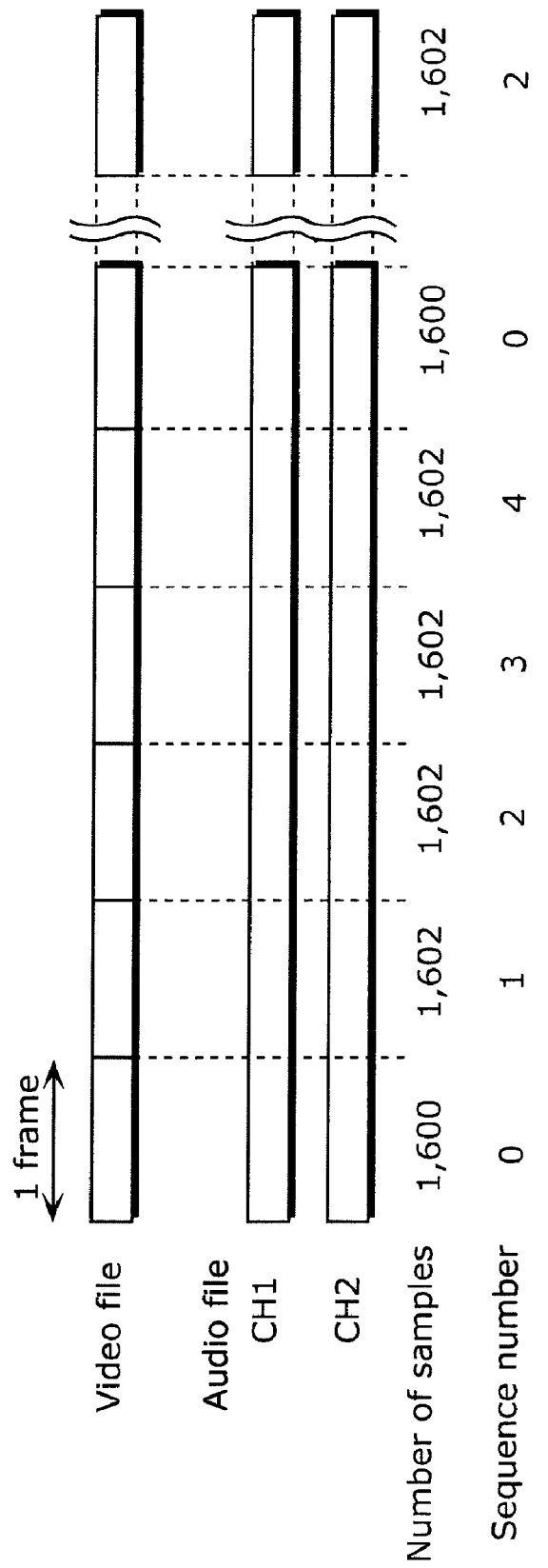
FIG. 5 is a diagram which shows a relationship between a video frame recorded in the embodiment and the number of audio samples.

FIG. 5 is a diagram which shows a relationship between a video frame recorded in an embodiment of the present invention and the number of audio samples. An example of synchronizing a video file and an audio file during recording will be described with reference to FIG. 5.

In the case of the NTSC method of the frame frequency of 29.97 Hz, when an audio sampling frequency is assumed to be 48 kHz, the number of audio sample for one frame time is 1601.6 samples. Accordingly, the number of audio sample becomes integral in five frame times.

Although a frame period of a video is not described in an audio file in the waveform, the number of samples per a frame is counted by changing in five frame period of 1,600, 1,602, 1,602, 1,602, and 1,602, and the number of samples from the start to the end of recording is calculated based on the five frames in order to be synchronized with the video.

When representing the phase of repeating the five frames as a sequence number, the sequence number becomes a repetitions of 0 to 4. Accordingly, in the case of two audio channels, a data size per one frame is as follows.

1,600×2 bytes (sequence number=0)

1,602×2 bytes (sequence number=1, 2, 3, 4)

FIG. 6 is a diagram which shows an example of a display unit and an input unit according to the embodiment of the present invention. The display unit 139 is implemented as, for example, a liquid crystal display device.

It is indicated to a user on the display unit 139 that two materials are included and a minified image of each of the materials is displayed as an icon, as shown in FIG. 6(a). The minified image can be generated by decoding only the beginning frame of a material video, for example.

The input unit 130 includes the arrow key 1102 and various key switches (1103 to 1105) as shown in FIG. 6(b). The user can select a material using the arrow key 1102 and reproduce the selected material using the reproduction button 1104. In addition, reproduction can be stopped using the stop button 1103.

Further, the user can instruct deletion or repair of the selected material from a menu of operations displayed by using the menu button 1105.

Next, the FAT file system will be described.

Figure 7:
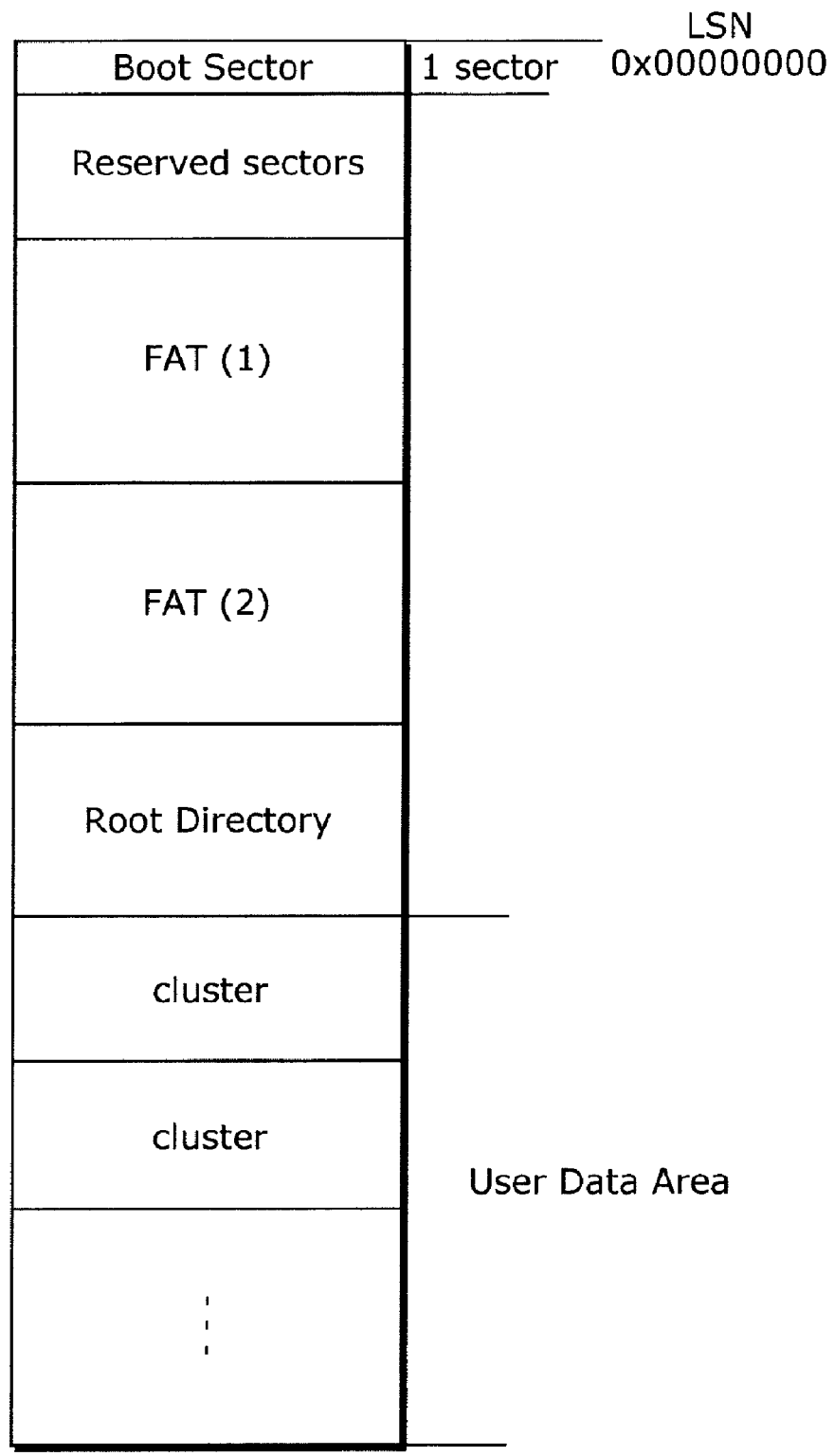
FIG. 7 is a diagram which shows a recording format of a recording medium in the FAT file system.

FIG. 7 is a diagram which shows a recording format of a recording medium according to the FAT file system.

In the FAT file system specified in the ISO/IEC9292, the management information and the user data region of the file system are arranged on a logical volume of the recording medium as shown in FIG. 7.

The uppermost section of FIG. 7 represents a logical sector numbered 0. A boot sector is recorded on the logical sector numbered 0. Information recorded on the boot sector includes information on the entire volume and information on a location of management information necessary for reading a file written in the user data region, such as the FAT or a root directory.

FIG. 8 is a diagram which shows information described in a boot sector of a FAT 16 file system.

The FAT 16 file system is a FAT file system specified by the ISO/IEC9292. Information specified by the ISO/IEC9293 is exemplified as information to be described in the boot sector.

A user data region is managed by a unit called a cluster that includes a single sector or unified consecutive sectors. All of the clusters are numbered serially starting from the beginning.

In some cases, a reservation area is provided between the boot sector and the FAT on which information on file allocation in the user data region is described. The number of sectors in the reservation area is described in the boot sector.

In addition, it is often allowed to record plural FATs in the FAT file system. The number of FATs and the number of sectors per a FAT are described in the boot sector.

Information on the file or the directory recorded on the root directory is listed following the sector immediately after the single or plural FATs. In addition, the user data region includes the sector immediately after the root directory entry and subsequent sectors.

Information on a directory is called a directory entry and information on a file is called a file entry. A name of a directory, a creation date and time of a directory, and a cluster number are recorded in the directory entry.

A directory entry belonging to the directory or a file entry are recorded in the user data region in the first region corresponding to the cluster number of the directory entry.

A file name, a file creation date and time, a file size, a file length, and the number of the first cluster in which the file is stored are recorded in the file entry.

Figure 9:
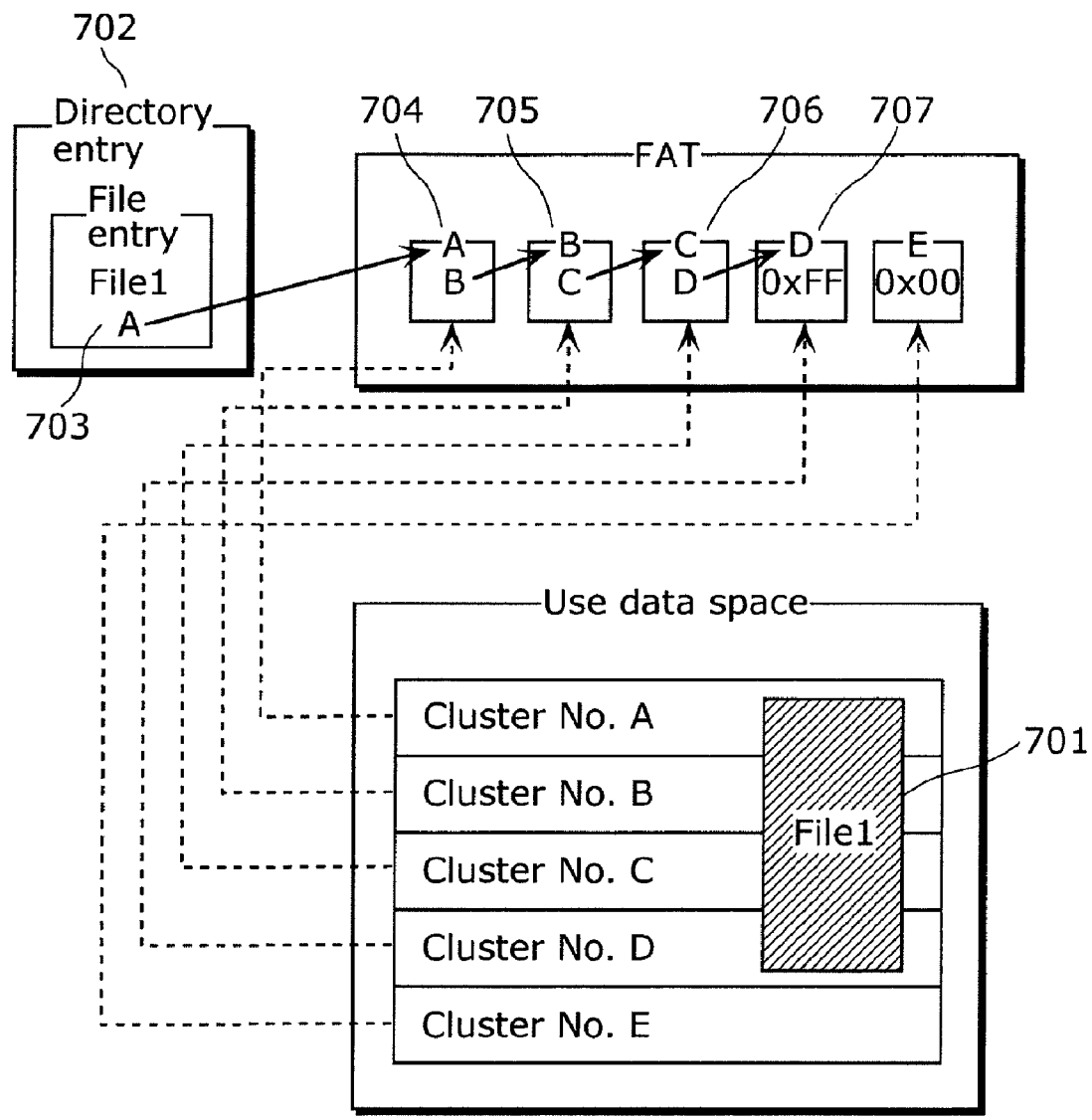
FIG. 9 is a diagram which shows a relationship between a file and file management information, and a file recording method.

FIG. 9 is a diagram which shows a relationship between a file and file management information in the FAT file system and a file recording method.

The FAT includes FAT entries each of which has a corresponding one of the clusters. The following will describe a method of recording, on the user data region, a file 701 in a size corresponding to four clusters in the user data region.

First, the file system 105 generates a file entry 703 of a File 1, in a directory entry 702 of a directory on which recording is performed. Next, the file system identifies, among plural FAT entries included in the FAT, four FAT entries on which a specific bit stream indicating being unassigned ("0x00" in the case of the FAT 16 file system) is recorded.

It is assumed, for example, that an unassigned bit stream is recorded on the FAT entries (704 to 707) each of which is associated with a corresponding one of four clusters including the Ath, the Bth, the Cth, and the Dth clusters. In this case, the file system 105 divides the file and records into the four clusters in the user data region.

The file system 105 further records a number "A" on a field of the beginning cluster number of the file entry 703 so that the relationship between the file entry 703 and the four clusters are recorded. At the same time, the number of the next cluster in which the file is recorded, that is, the number B is recorded on the FAT entry 704 corresponding to the cluster A.

The file system 105 records, in the same manner, the number "C" on the FAT entry 705 corresponding to the cluster B and records the number "D" on the FAT entry 706 corresponding to the cluster C.

The file system 105 records a specific bit stream ("0xFF" in the FAT 16 file system) indicating the end-of-file on the FAT entry 707 corresponding to the last cluster on which the file is recorded (the cluster D in this example).

As described above, the file system 105 records link information specifying the next cluster on FAT entries each of which has a corresponding one of the clusters used for recording a single file.

Thus, a connection order of information recorded on each of the clusters is indicated by the file entry 703 and the FAT entries 704 to 707.

When reading the file from the user data region, it is possible to reach the end-of-file by following the connection of clusters indicated in the file management information of the file entry 703 and the like.

It is to be noted that, a file system that uses 12 bits per one FAT entry is called a FAT 12 file system, a file system that uses 16 bits is called a FAT 16 file system, and a file system that uses 32 bits is called a FAT 32 file system.

Recording operations, especially a recording operation at the time of file closing according to the present invention will be described in detail here with reference to FIG. 10 to FIG. 12.

Figure 10:
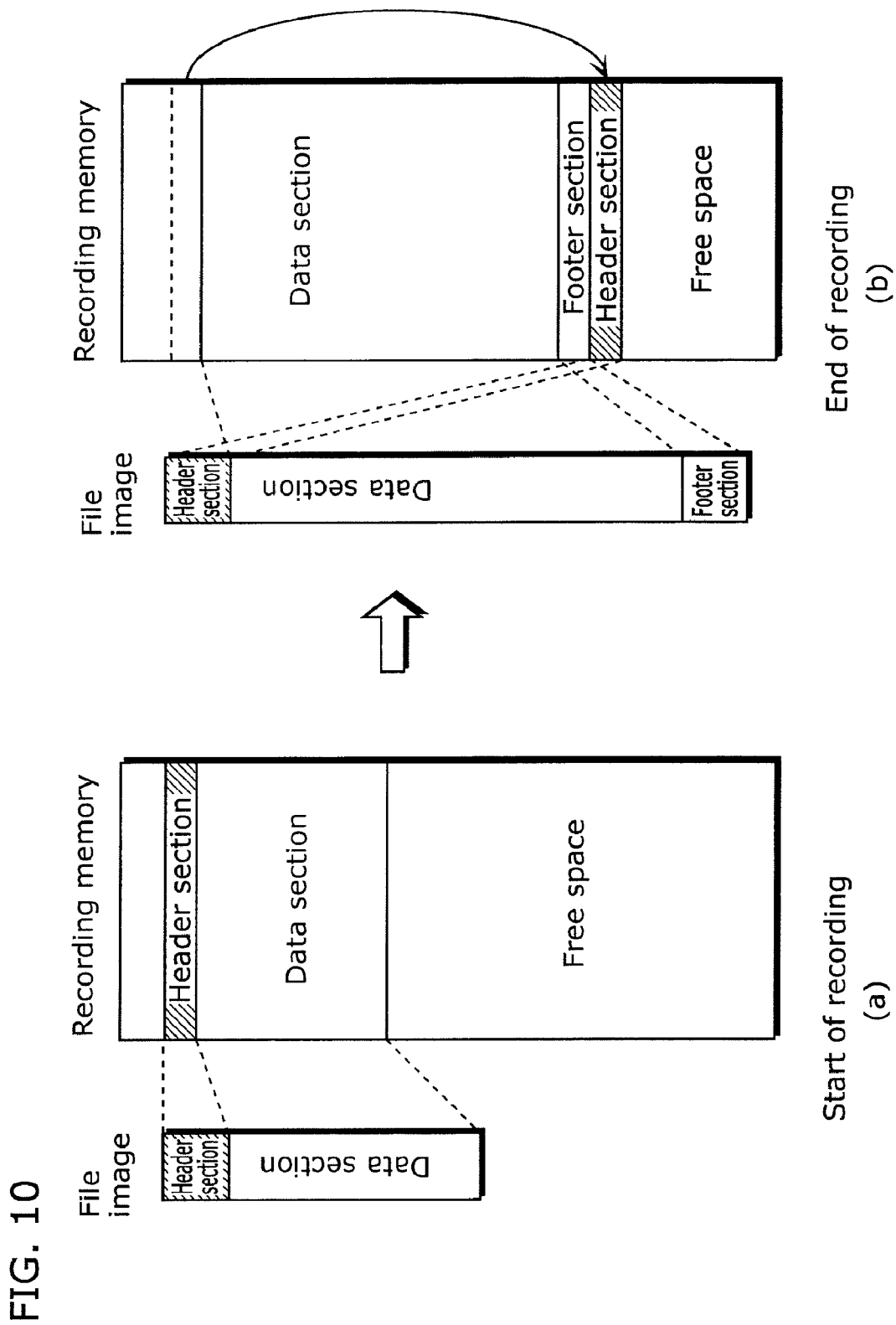
FIG. 10(*a*) is a diagram which shows an example of a state of a file image and a recording memory at the start of recording according to the embodiment, and FIG. 10(*b*) is a diagram which shows an example of a state of a file image and a recording memory at the end of recording according to the embodiment.

FIG. 10 is a diagram which shows an example of a state of a file image and a recording memory at the time of starting recording and ending recording according to an embodiment of the present invention.

Figure 11:
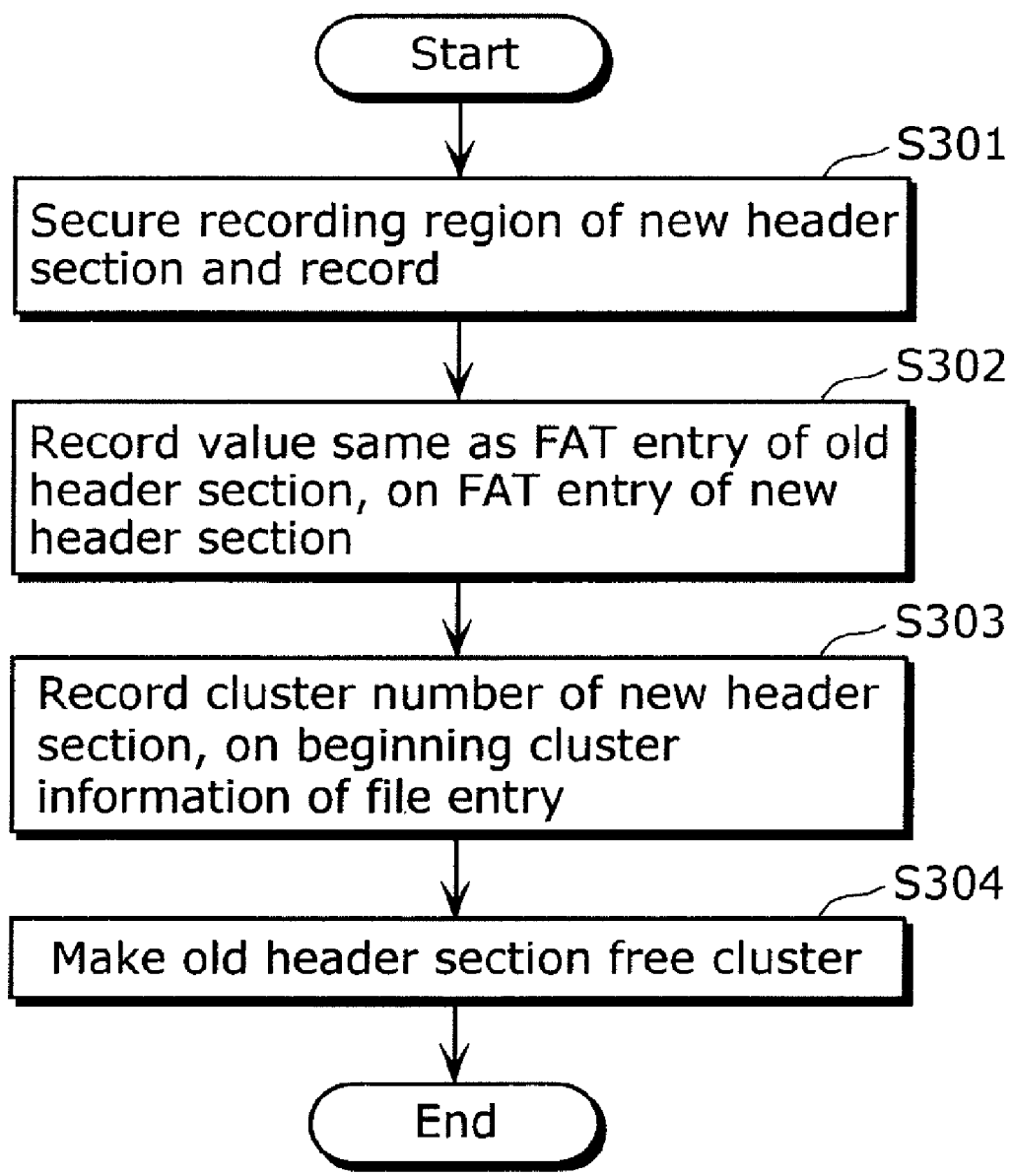
FIG. 11 is a flowchart which shows a recording procedure according to the embodiment.

FIG. 11 is a flowchart which shows a recording procedure according to an embodiment of the present invention.

Figure 12:
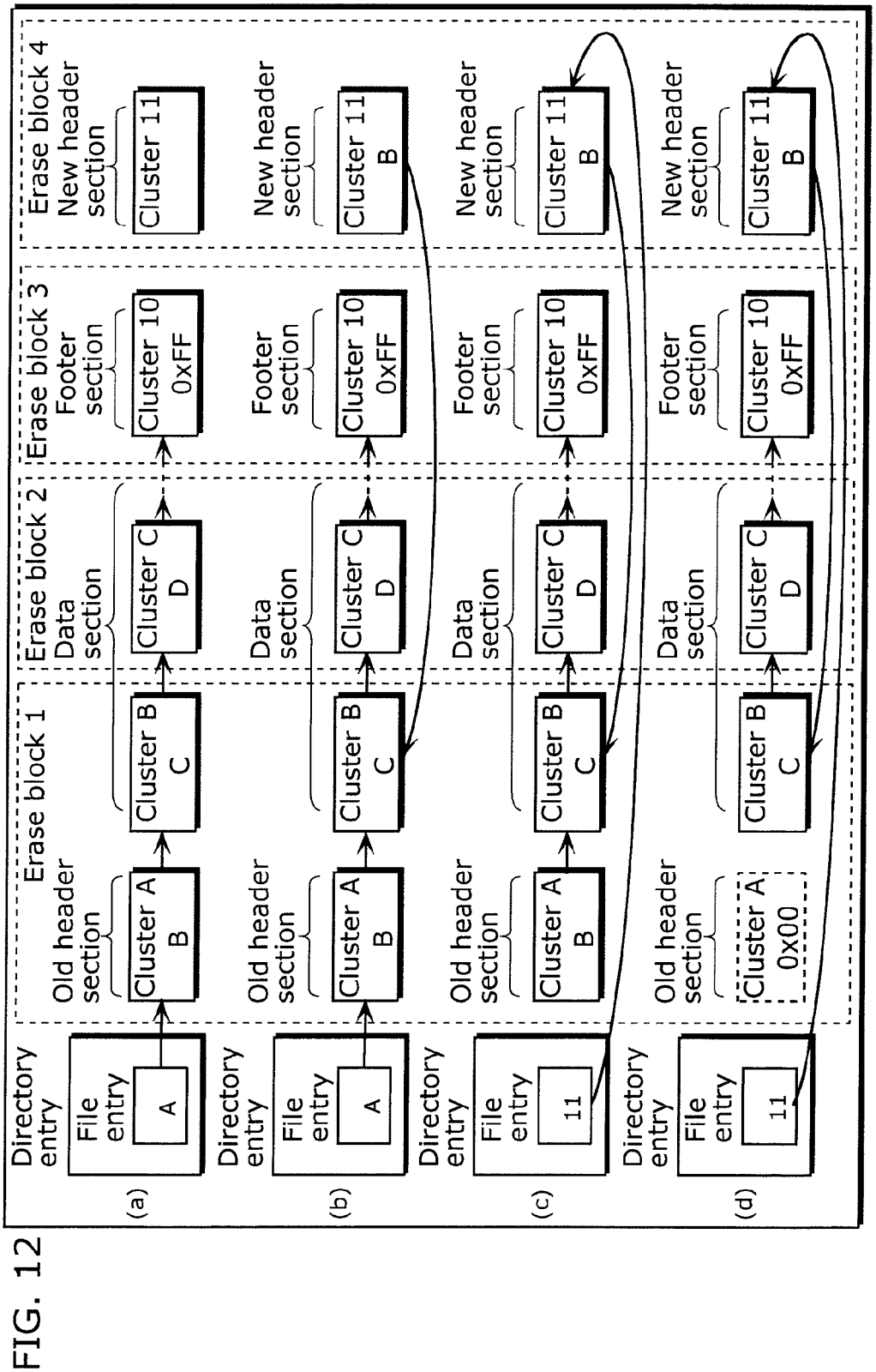
FIG. 12 is a diagram which shows an example of changes in a connection between a file entry and clusters according to the embodiment.

FIG. 12 is a diagram which shows an example of changes in connection between a file entry and clusters according to an embodiment of the present invention.

It is to be noted that, the size of a header section is assumed to be 32 KB (=1 cluster size), the size of a footer section is assumed to be 224 bytes, and free area is assumed to be filed with filler.

Video and audio recording operations start when the input unit 130 receives a request from a user for starting recording.

More specifically, when the input unit 130 receives an instruction for starting recording, the video file processing unit 102 and the audio file processing unit 103 instruct the file system 105 to open one video MXF file that records a video and two audio MXF files that record an audio.

The file system 105, when receiving an open instruction from the video file processing unit 102 and the audio file processing unit 103, generates a file entry for each of the files.

It is to be noted that, since the recording operations of the video file and the audio file are substantially the same, the following will describe only the video file.

Next, the video file processing unit 102 generates data of the header section in which "0" is recorded on the Length section and issues an instruction of recording the header section to the file system 105.

The file system 105 does not write the data of the header section on the recording memory 111 at this stage, but once stores into the file system memory 106. This is because writing on the recording memory 111 is performed on a recording block basis.

More specifically, data is not recorded until data of 1 MB including video data following the header section is accumulated in the file system memory 106. However, data of 1 MB does not necessarily have to be accumulated before recording, but in some cases data less than 1 MB is recorded on the recording memory 111 when recording is stopped or instructed by the video file processing unit 102.

Next, the video file processing unit 102 issues to the file system 105, an instruction of recording the video data following the header section. The file system 105, when data of 1 MB is accumulated in the file system memory 106, searches for a free recording block by referring to the FAT entries in the FAT.

The file system 105, when a free recording block is found, records on all of the FAT entries corresponding to the recording block, a cluster number so that the clusters from the beginning to the end of the recording block are connected.

The file system 105 further records, on the field for the number of the beginning cluster of the file in the file entry, the number of the beginning cluster in the recording block. Then, the file system 105 records accumulated data on the secured free recording block. FIG. 10(*a*) shows a state of a file image and a recording memory at the start of recording described above.

Subsequently, processes as described above are repeated until a request for ending recording is received from a user or the recording memory 111 is used up. More specifically, processes of accumulation of data of 1 MB, securing a free recording block, and writing data on the recording block are repeated.

Here, when the recording memory is used up, it means the state in which all of the recording blocks in the recording memory 111 are used excepting one block to be used for recording a new header section.

In addition, in the case where accumulated data is recorded on the recording memory 111 every time data of one cluster is accumulated in the file system memory 106, when the recording memory 111 is used up, it means the state in which all of the clusters of the recording memory 111 are used excepting one cluster to be used for recording a new header section.

It is to be noted that, the amount of space of the recording memory 111 is recognized by the recording memory processing unit 104 via the file system 105. Thus, recording memory processing unit 104 detects that the recording memory 111 is used up, for example.

The video file processing unit 102 performs file closing processing when a request for ending recording is received from a user or the recording memory 111 is used up.

More specifically, the video file processing unit 102 performs file closing processing when it is detected that the amount of space of the recording memory 111 becomes less than a predetermined amount.

The video file processing unit 102, at the time of closing processing, first instructs the file system 105 to add data of the footer section to the end of the file.

The file system 105 secures a free recording block and records a cluster number on the FAT entries so that the data of the footer section is positioned immediately after the last video data. However, an end bit stream is written in the FAT entry of the cluster on which the footer section is recorded.

The file system 105 records on the secured recording block at this point in the case where the data accumulated in the file system memory 106 has reached 1 MB including the data of the footer section. In the case where the data is less than 1 MB, the data is stored until recording of the header section described below is performed.

Next, the video file processing unit 102 reads the header section that has already been recorded, and updates the Length section included in the header section to be the size of the recorded data section. Thus, the video file processing unit 102 generates a new header section in which the size of the data section that is determined by the completion of recording is stored in the Length section.

The video file processing unit 102 further issues an instruction of updating the header section to the file system 105.

The file system 105, when the instruction of updating the header section is received from the video file processing unit 102, secures a free cluster (also referred to as an "unused cluster") for newly recording the updated header section and writes the updated header section, that is, a new header section into the cluster, not into the region on which the header section has already been recorded.

Then, the file system 105 changes the FAT or the file entry so that the new header section becomes the beginning of the file, and performs processing of changing the cluster on which the header section before update has been recorded into an unused cluster, that is, processing of deallocating a region of an old header section.

A method of updating a header section performed by the file system 105 will be described with reference to a flowchart in FIG. 11.

First, the file system 105 secures a free cluster for recording a new header section and writes information of the new header section on the cluster (S301).

Here, in the case where the end of the data section and the footer section have been stored because the size is less than 1 MB, the file system 105 secures a free cluster in the same recording block as the recording block including the cluster secured for recording the end of data section and the like and records the new header section together with the end of the data section and the like on the recording memory 111.

Otherwise, the file system 105 secures a new recording block for the new header section and writes the new header section immediately on the recording memory 111 without storing in the file system memory 106.

Next, the file system 105 writes, on a FAT entry corresponding to the new header section, a value of a next cluster number recorded on the FAT entry of an old header section, that is, a first cluster number of the data section (S302). This makes it possible that the data section follows the new header section.

Next, the file system 105 writes a cluster number of the new header section on the field of the beginning cluster of the file entry so that the new header section becomes the beginning of the file (S303).

Lastly, the file system 105 writes an unassigned bit stream on a FAT entry corresponding to the old header section to make the cluster free and ends the processing (S304).

An example of changes of connections between the file entries and the clusters as described above will be explained with reference to FIG. 12.

First, a cluster 11 is secured for recording a new header section as shown in FIG. 12(*a*). Next, "B" that is the same number as in a cluster A of an old header section is assigned to a value of a FAT entry of the cluster 11 as shown in FIG. 12(*b*).

Next, the number of the beginning cluster of the file entry is changed to "11" that is the number of the cluster on which the new header section is recorded, as shown in FIG. 12(*c*).

Lastly, a cluster A on which the old header section is recorded is deallocated, as shown in FIG. 12(*d*). More specifically, "0x00" indicating that the cluster A is an unused cluster is recorded on a FAT entry corresponding to the cluster A.

It is to be noted that, the cluster 11 is a free cluster and a cluster in an erase block different from the erase block at the start of recording, as shown by a dot line in FIG. 12.

More specifically, FIG. 12 shows that the cluster A and the cluster B are included in the erase block 1, the cluster C is included in the erase block 2, the cluster 10 is included in the erase block 3, and the cluster 11 is included in the erase block 4.

As shown in FIG. 12, all of the regions other than the directory entry are included in any of the erase blocks. It should be understood that the details included in each of the erase blocks are not limited to the details as shown in FIG. 12.

For example, although the erase block 4 includes only the cluster 11 in FIG. 12, there is a possibility that the erase block 4 includes the data section or the footer section immediately before the erase block 4.

It is to be noted here that, with a conventionally used general recording method, read-modify-write operation is performed on the erase block 1 on which data of the cluster A is written when rewriting an old header section (cluster A).

In addition, with the recording method disclosed in Patent Reference 1 as shown in FIG. 2, the entire data of the erase block 1 including the cluster B is read and held, the cluster A in the data is updated to be the content of the new header section, and then the data is written into the erase block 4.

More specifically, an operation by which the entire data in a block is read and a portion of the data is updated and the updated data is written into a storage medium; that is, substantially the same operation as the read-modify-write, is carried out.

On the other hand, according to the present invention, the header section read only from the cluster A, instead of the entire block 1, is updated and the new header section that has been updated is recorded on the unused cluster 11. In addition, a region in the erase block 4 on which data of the cluster 11 is to be written is unused as well. Thus, the read-modify-write operation is not carried out.

Further, the FAT that is the file management information and the directory entry is corrected so that the cluster 11 on which the new header section is recorded is followed by the cluster B of the beginning of the data section.

This makes it possible, when reading the file, to read all of the data that makes up the file and properly reconstruct the life.

With this processing, the logical image of the file after closing becomes the file image at the time of the end of recording as shown in FIG. 10(b). On the other hand, in a physical data order as indicated by the recording memory at the end of recording as shown in FIG. 10(b), the header section is generally arranged at the end unlike the start of recording as shown in FIG. 10(a).

It is to be noted that, since the FAT entry and the file entry are arranged in the first region of the recording memory 111, an overhead caused by rewriting the details is small and does not affect recording of the video data.

Further, the case where the entire recording region of the recording memory 111 is configured by a flash memory is assumed. In this case, file management information such as a FAT entry is stored in the flash memory region as well. With this, a read-modify-write operation is carried out due to rewriting the file management information even in the recording and reproducing apparatus 100.

However, even in the case where a conventional recording method including the one disclosed in Patent Reference 1 is performed, the file management information is rewritten so that a file size is updated and so on at the end of recording a file.

Thus, in the case where the conventional recording method is performed on a recording medium configured entirely by a flash memory, both of the read-modify-write operation that accompanies rewriting of file management information and the read-modify-write that accompanies updating of a header section as described above are carried out.

Therefore, the recording and reproducing apparatus 100 according to the present embodiment has a higher processing efficiency than the conventional recording method since the read-modify-write that accompanies updating of a header section is not carried out in the recording and reproducing apparatus 100. For that reason, it is possible, for example, to obtain a higher recording speed than before.

Here, the order of processes in the method of updating a header section is as follows: securing a FAT entry (S301), changing the FAT entry (S302), changing the file entry (S303), and deallocation of the FAT entry (S304).

It is to be noted that, deallocation of the FAT entry is to make a cluster corresponding to the FAT entry an unused cluster, and also means freeing the cluster.

The reason for the order is to prevent a corruption of a file and the file system 105. More specifically, in the case where deallocation of the FAT entry is performed prior to any other processes, there is a possibility of a file corruption such as deletion of information on the header section or information on a link to the next data section when the power is shut off immediately after the deallocation the entry.

In addition, in the case where changing the file entry is performed prior to any other processes, there is a possibility of an abnormal state where the file entry indicates a FAT entry that has not been secured, and so on.

Figure 13:
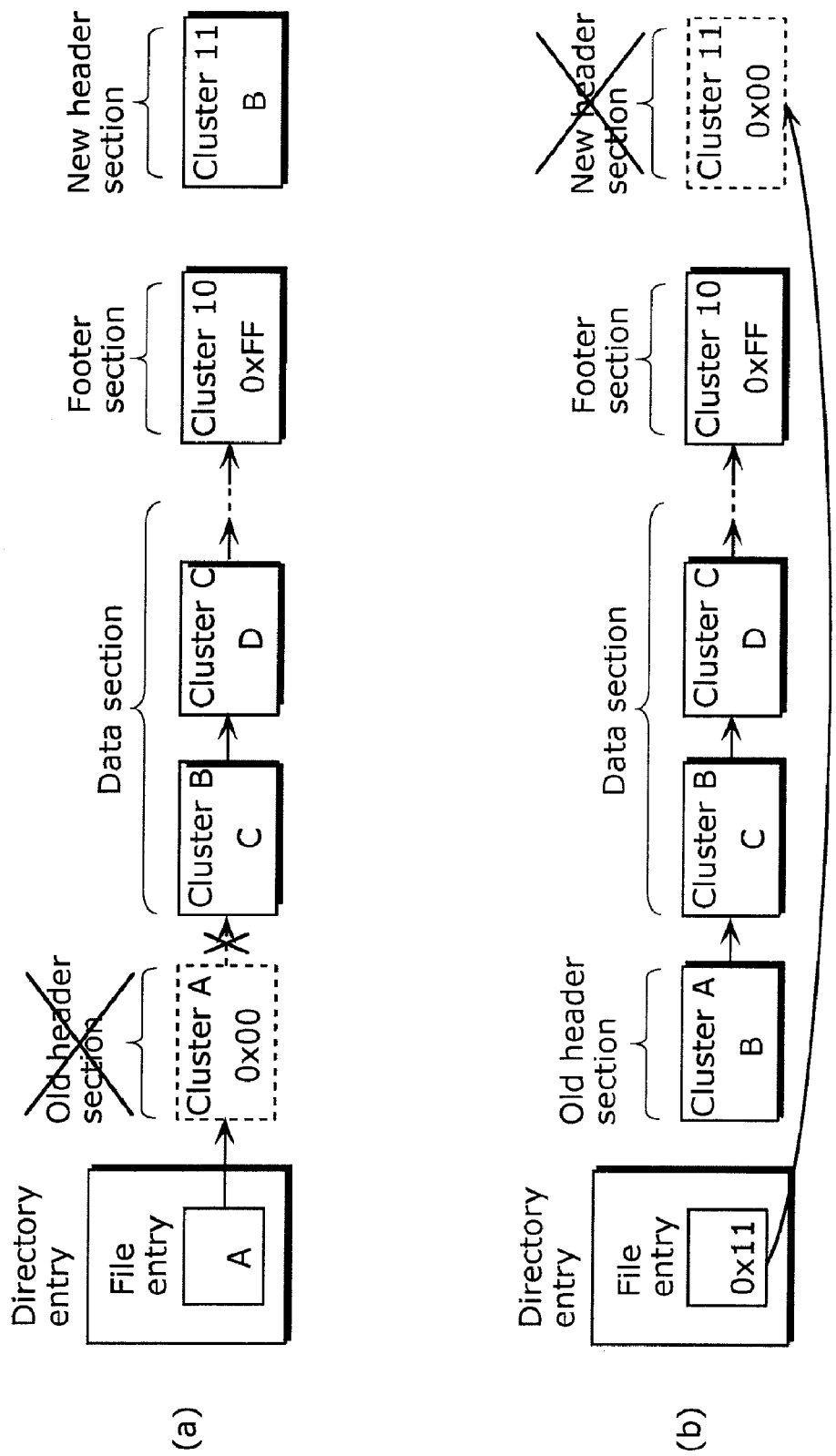
FIG. 13(*a*) is a diagram which shows an example of a file and a corruption state of a file system, and FIG. 13(*b*) is a diagram which shows the other example of a file and a corruption state of a file system.

FIG. 13 is a diagram which shows an example of a file and a corruption state of a file system. As stated above, in the case where deallocation of the FAT entry is performed first, more specifically, in the case where recording of "0x00" on the FAT entry corresponding to an old header section is performed first as shown in FIG. 13(a), there is a possibility of an abnormal state where the information on the header section is deleted, and so on.

Further, in the case where changing the file entry is performed first, more specifically, in the case where recording of "0x11" on the file entry is performed first as shown in FIG. 13(b), there is a possibility of an abnormal state of indicating a FAT entry 11 that has not been secured, and so on.

According to the present invention as described above, when updating a header section recorded on a cluster, the header section is updated by not reading the entire block including the cluster, but reading the header section only from the cluster. Further, the updated header section is written into another free cluster.

More specifically, when updating a header section of a file according to the present embodiment, an updated header section is recorded on a cluster in a newly secured block, instead of a block that has already been secured.

With this, the read-modify-write operation is not carried out, and thus it is possible to perform recording processing at high speed.

In addition, since a header section is recorded first when recording a file according to the present invention, it is possible to repair the file even when the power is shut off during the recording and so on, and to retrieve data that has been recorded immediately before the power shut off.

In addition, even when a new header section is positioned physically behind a data section on a recording memory, the header section is positioned logically at the top by correcting file management information such as a file entry, according to the present invention. Thus, it is possible to maintain a correct file configuration.

In addition, since the recording region of an old header section is deallocated according to the present invention, it is possible to avoid uselessly consuming a capacity of memory.

Here, a description will be given as to repairing a file.

FIG. 14 is a diagram which shows an example of a display unit and an input unit according to the embodiment of the present invention. A file repairing operation is performed in response to an instruction of a user from the input unit 130.

As shown in FIG. 14(a), the display unit 139 displays a material 1 and a material 2 which have been recorded. A mark "x" which indicates that an abnormal file that needs to be repaired is included is displayed under the icon indicating the material 2.

Whether or not a material includes an abnormal file as in the material 2 is determined by comparing the size of the data section and the Length information of the header section for each file of the material.

Here, the size of the data section is obtained by subtracting the size of the header section from a file size. The reason the size of the footer section is not considered when obtaining the size of the data section is that the footer section is added only when the file is normally recorded.

It is determined to be a normal file when the size of the data section matches the value of Length of the header section, and an abnormal file when the size of the data section does not match the value of Length of the header section. The accuracy of this determination is apparent from the description of the recording operation of a video and an audio as described above.

A user selects a material to be repaired by using the arrow key 1102, and presses the menu button 1105 to display the menu of operations. Then, the user selects repair from the menu of operations and provides an instruction of a file repairing operation.

Figure 15:
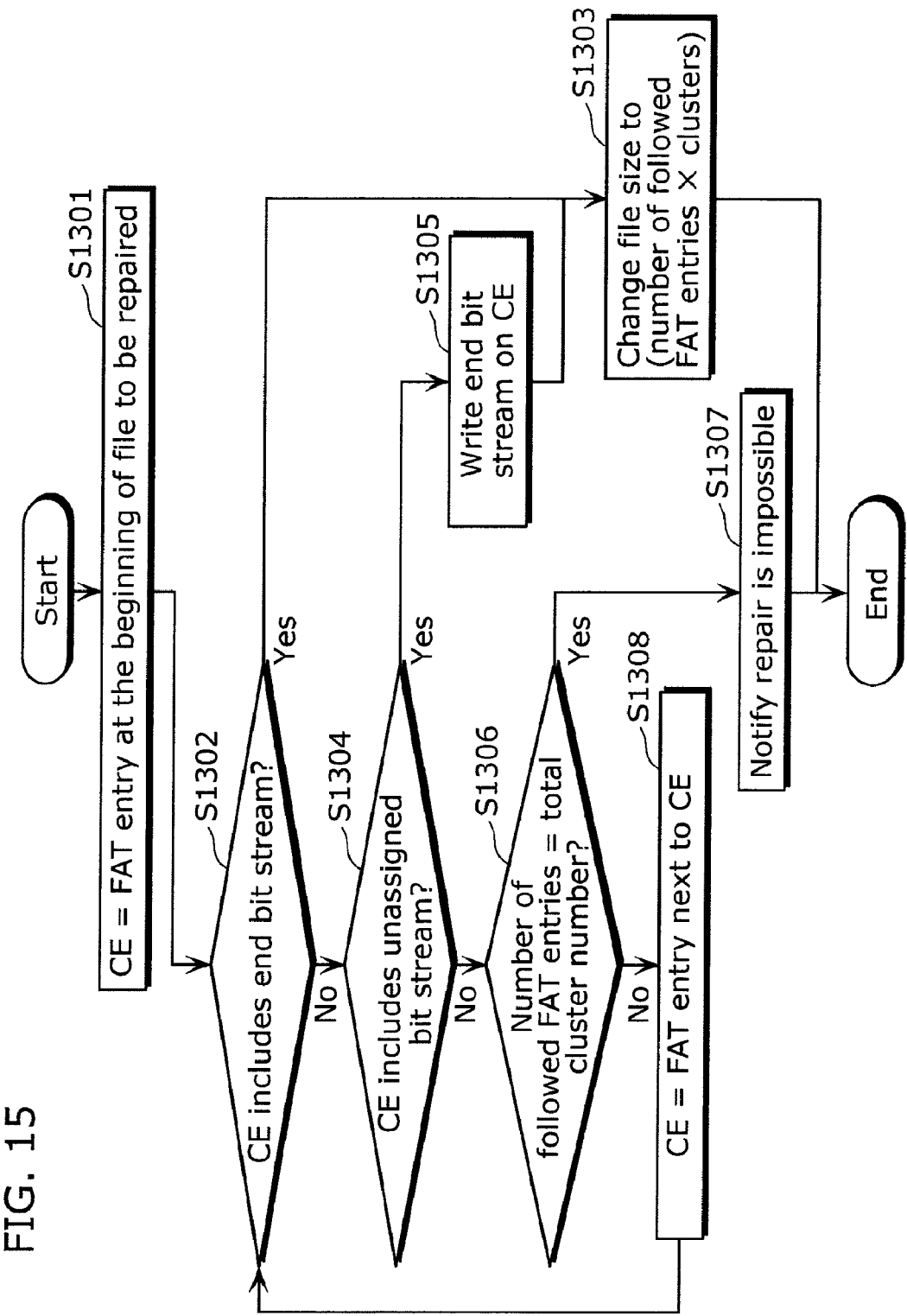
FIG. 15 is a flowchart which shows a repairing procedure according to the embodiment.

FIG. 15 is a flowchart which shows a procedure of repairing a FAT entry and a file size according to an embodiment of the present invention. The following describes repairing of a FAT entry and a file size with reference to FIG. 15.

First, when receiving a repair instruction from a user, the file repairing processing unit 109 follows FAT entries of an MXF file to be repaired by using the file system 105.

A variable CE shown in FIG. 15 indicates the number of the FAT entry which is the current target of the file repairing processing unit 109, and the number of the FAT entry at the beginning of the file to be repaired is assigned first to the CE (S1301).

Next, the FAT entry of the CE is checked to see whether or not an end bit stream is included (S1302). In the case where the end bit stream is included in the FAT entry, the file size is changed to a value that is calculated by multiplying the number of FAT entries from the beginning to the end by a cluster size (S1303), and the processing is ended.

In the case where the end bit stream is not included in the FAT entry in S1302, it is checked whether or not an unassigned bit stream is included (S1304). In the case where the unassigned bit stream is included in the FAT entry, the FAT entry is rewritten to be the end bit stream (S1305), and the process proceeds to S1303.

When following of each of the FAT entries leads to an unassigned FAT entry, there is a possibility that a power shutdown and the like has occurred before securing of the FAT entry is recorded on the recording memory 111, and that data immediately before the power shutdown has been recorded on the cluster corresponding to the FAT entry.

Accordingly, in such a case, the end bit stream is written into an unassigned FAT entry to be a part of the file.

In the case where an unassigned bit stream is not included in S1304, it is examined whether or not the number of FAT entries followed so far is equal to a total cluster number (S1306). This process is for determining whether or not the FAT entries are connected in a loop form.

Here, the total cluster number is the total number of clusters that can be secured in the recording memory 111. The total number can be calculated using the number of sectors per a cluster and the total number of sectors which have been described in the boot sector.

Since the FAT entries are in the loop form in the case where the number of FAT entries followed in S1306 is equal to the total cluster number, a notification indicating that repair is impossible is made and the processing is ended (S1307).

In the case where the number of FAT entries followed in S1306 is different from the total cluster number, the number of the next FAT entry written in the current target entry is assigned to the variable CE, and the processing returns to S1032 (S1308).

With the above-described processing, it is possible to repair the FAT entry and the file size related to an abnormal file. As a result of the processing, however, the file size becomes an integral multiple of the cluster size.

Since the valid data size of a repaired file is not necessarily the integral multiple of the cluster size, there is a possibility that, when reading the file, even meaningless data at the end may also be retrieved. In addition, since the Length section of the header section and the footer section in the file have not been correctly recorded, it is also necessary to repair those parts.

The following describes correcting of a file size and repairing of a header section and a footer section.

When repairing a FAT entry and a file size is completed, the file repairing processing unit 109 reads file information from the header section of the file and determines whether the file is a video file or an audio file.

First, the case of repairing a video file is described. The file repairing processing unit 109 obtains a DIF coding amount for one frame according to a data type or a frame frequency included in the file information in the header section of the video file.

The DIF coding amount becomes 480,000 bytes in the case of the DVCPRO-HD NTSC, and 576,000 bytes in the case of the PRO-HD PAL. A valid data size of the file to be repaired can be obtained using the DIF coding amount. Accordingly, a corrected file size can be calculated using the following equation.

corrected file size=*DIF* coding amount×*Int*((file size−header section size)/*DIF* coding amount)+header section size+footer section size It is assumed, however, that Int( ) is a function that returns an integral number part of a numeric value in brackets.

The file repairing processing unit 109 writes the above-described corrected file size into the file entry of a repaired file, writes a data section size obtained from the corrected file size into the Length section of the header section of the data section size, adds the footer section to the repair file, and ends the file repairing operation.

Next, the case of repairing an audio file is described. The file repairing processing unit 109 obtains the number of the audio samples for one frame time using the type, the number of bits, and the sampling frequency of data in the file information in the header section of the audio file, and the frame frequency in the file information in the header section of the video file.

For example, in the case where the format of the audio file is the waveform, the sampling frequency is 48 kHz and the number of bits is 16 bits in the audio file, and the frame frequency is 29.97 Hz and the format is the NTSC in the video file, the number of audio samples becomes 1,601.6 samples.

Further, in the case where the audio file is the waveform, the sampling frequency is 48 kHz and the number of bits is 16 bits in the audio file, and the frame frequency is 25 Hz and the format is the PAL in the video file, the number of audio samples becomes 1,920 samples.

A valid data size can be obtained using the number of the audio samples in the same manner as the repairing of the video file as described above. However, in the case where the frame frequency of the video file is 29.97 Hz NTSC, the number of samples is calculated based on 5 frames (=8,008 sample numbers) because it is not an integer.

Figure 16:
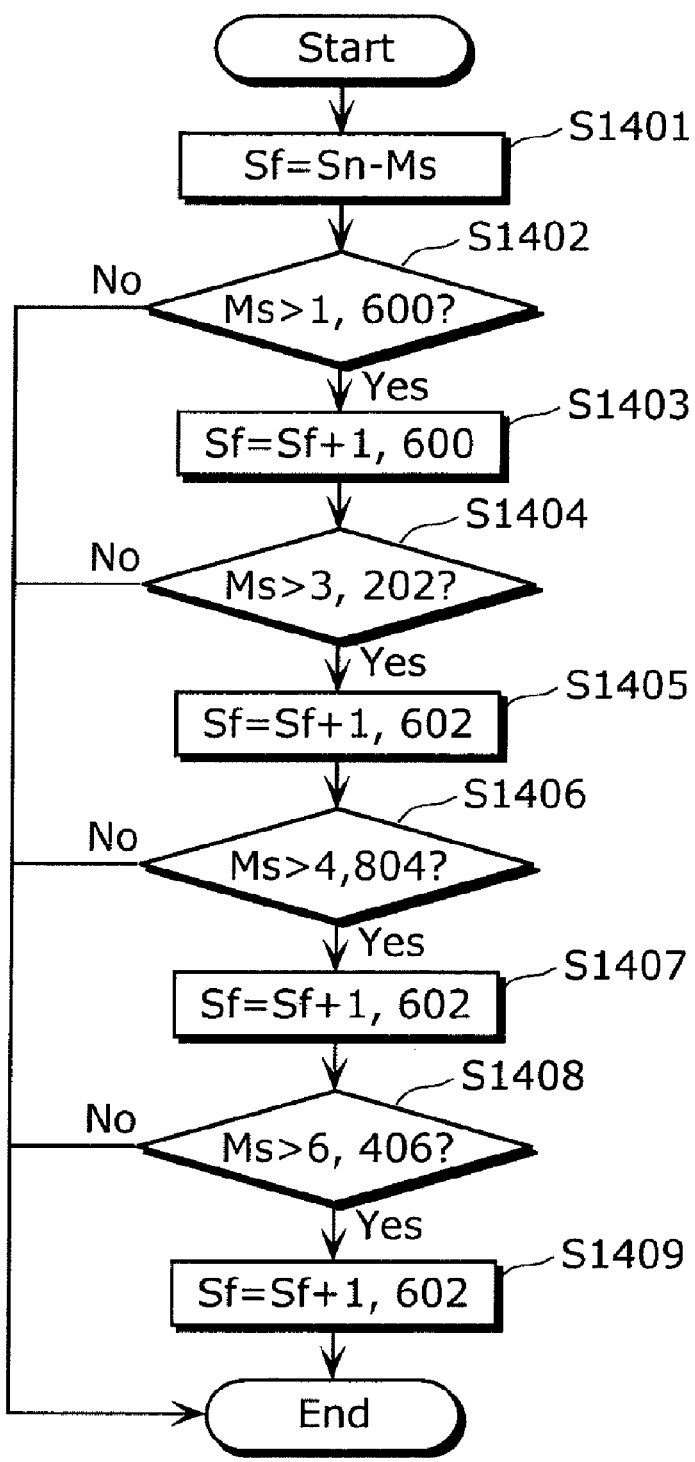
FIG. 16 is a flowchart which shows a calculation procedure of the number of audio samples according to the embodiment.

FIG. 16 is a flowchart which shows a calculation procedure for the number of audio samples according to an embodiment of the present invention. The following describes a method of calculating the number of samples in the case where the video file frame frequency is 29.97 Hz NTSC.

The variable Sf indicates the number of samples to be obtained, the variable Sn indicates the number of samples calculated from the file size before correction, and the variable Ms indicates the remainder of Sn when divided by 8,008. The variable Sn can be calculated using the following equation.

$$Sn=Int((\text{file size}-\text{header section size})/(16 \text{ bits}/8))$$

First, the value of the variable Sn−Ms is assigned to the variable Sf (S1401). Next, the variable Ms is compared to 1,600 (S1402). In the case where the Ms is equal to or smaller than 1,600, the current Sf is the number of samples to be obtained, and thus the processing is ended.

Since the number of frames is larger than the sequence number 0 in the case of Ms>1,600 in S1402, 1,600 is added to Sf (S1403). Subsequently, the Sf is corrected in the same manner by examining to which sequence number the number of frames has reached (S1404 to S1409).

According to the Sf obtained through the method of calculating the number of samples as described above, the corrected file size becomes Sf×(16 bits/8)+header section size+footer section size.

In the case where the frame frequency of the video file is 25 Hz PAL, the number of audio samples becomes 1, 920 samples that is an integer, and thus the corrected file size becomes Sf×(16 bit/8)+header section size+footer section size.

As described above, the MXF file is repaired through repairing of the FAT entry and the file size, correction of the file size, and repairing processing of the header section and the footer section.

When completing the repair processing, the file repairing processing unit 109 notifies the user of completion of the repair processing by deleting the menu display and "x" mark displayed under the material 2 in FIG. 14(*a*).

It is to be noted that, although it is assumed in the present embodiment that the compression method of the video data is DVCPRO-HD and the compression method of the audio data is the waveform, other compression methods may be employed.

It is also to be noted that, although it is assumed in the present embodiment that the file format is MXF, other formats may be used as long as the file format has the header section at the beginning in the file configuration.

In addition, although it is assumed in the present embodiment that the size of the header section is a fixed length, the size may also be a variable length. In this case, it is arranged that the size is stored in the header section and the like and the system control unit 101 can detect the size.

In addition, the processing of updating the header section in the case where the header section can be included in one cluster has been described in the present embodiment. However, even in the case where the header section spans plural clusters, it is possible to perform an efficient recording processing according to the present invention.

Figure 17:
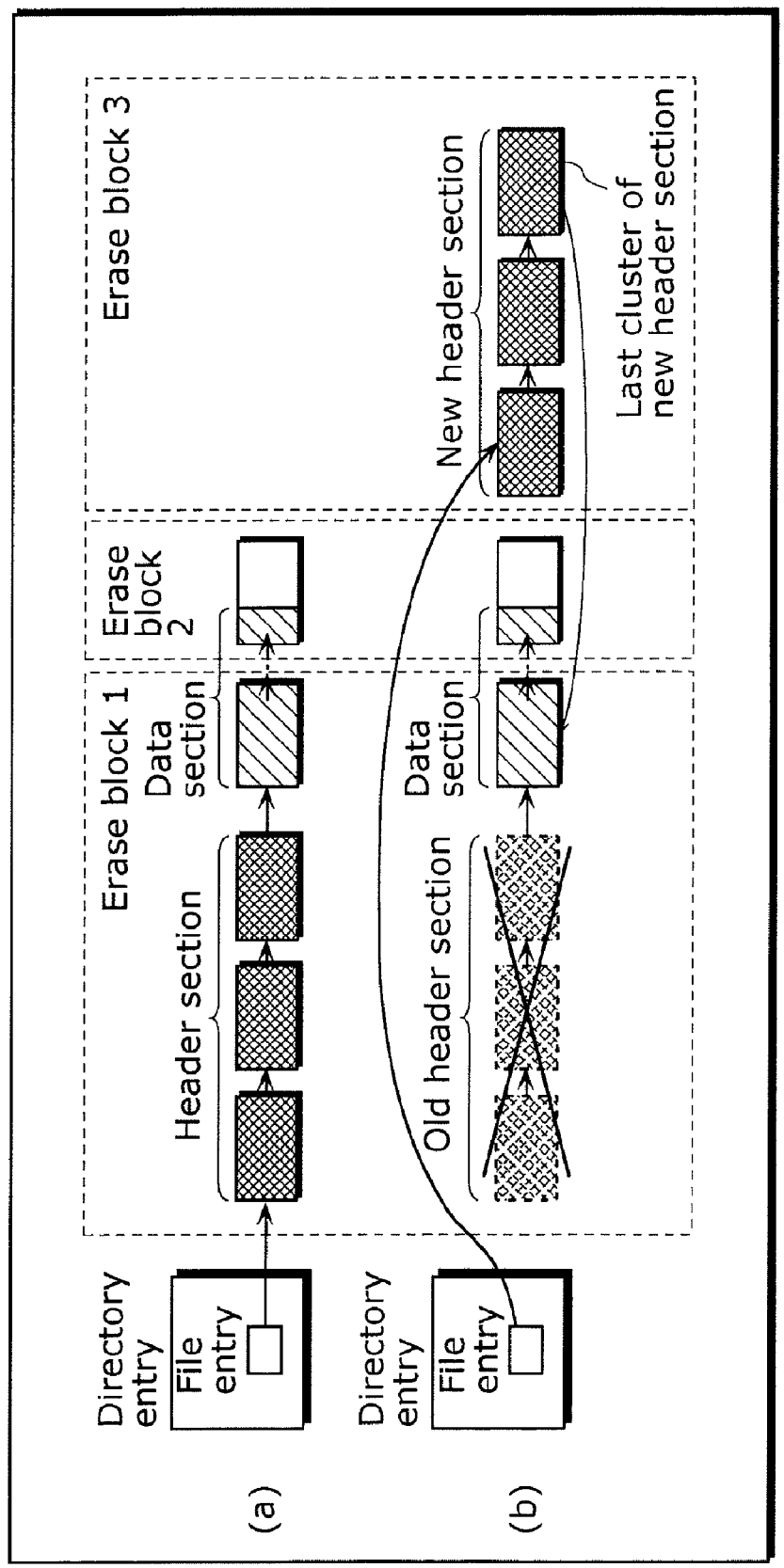
FIG. 17 is an explanatory diagram for a method of updating a header section in the case where the header section spans plural clusters.
Figure 18:
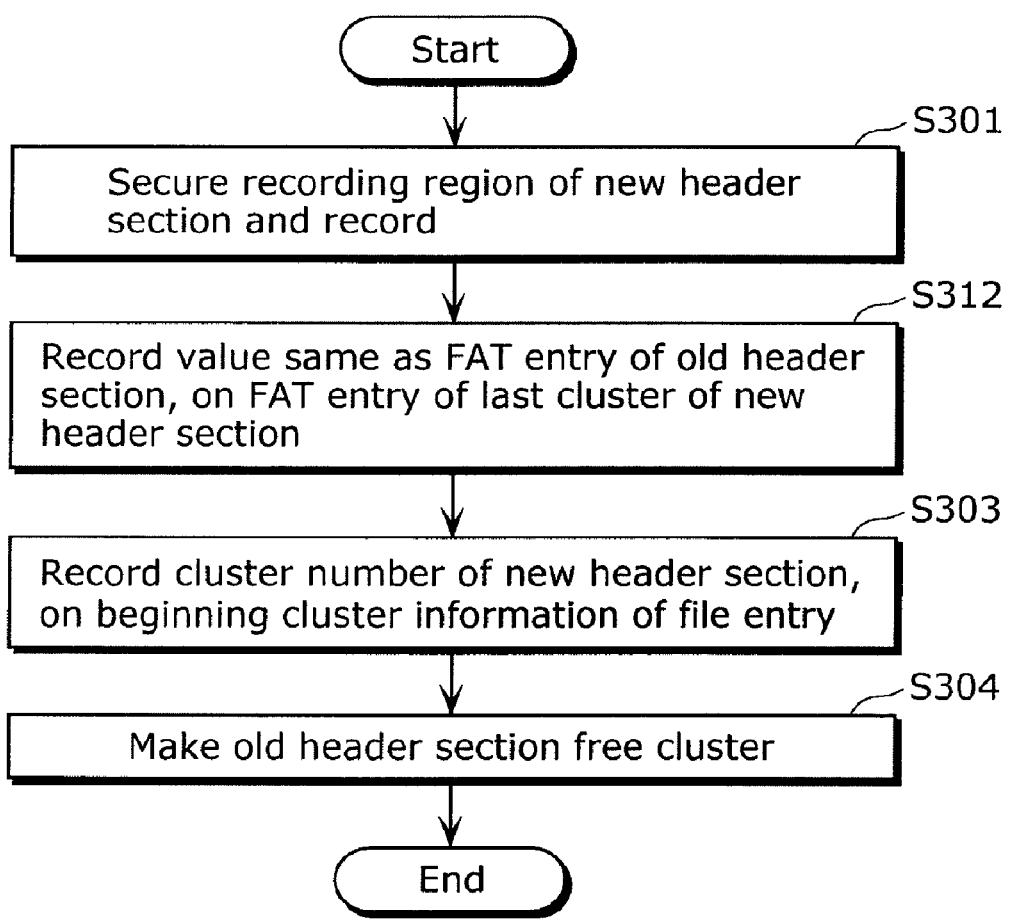
FIG. 18 is a flowchart which shows a procedure for updating a header section in the case where the header section spans plural clusters.
Figure 19:
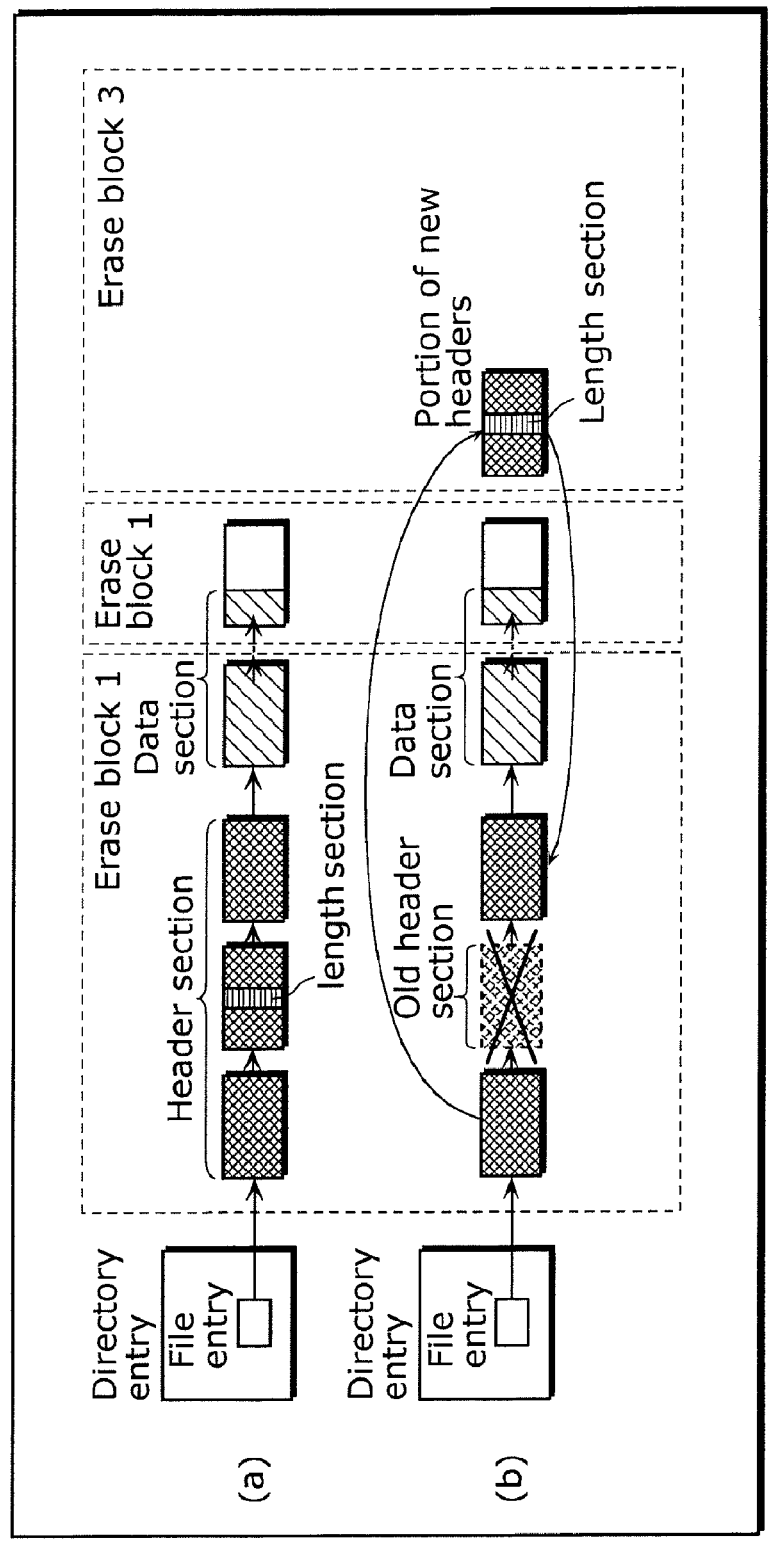
FIG. 19 is an explanatory diagram for a method of updating a header section in the case where the header section spans plural clusters.

The following describes the processing of updating a header section in the case where the header section spans plural clusters with reference to FIG. 17 to FIG. 19.

FIG. 17 is a diagram for explaining a method of updating a header section in the case where the header section spans plural clusters.

Although the erase blocks 1 to 3 are exemplified in FIG. 17, the details included in each of the erase blocks are not limited.

In the case where the header section spans plural clusters as shown in this diagram, the entire header section may be moved to a free cluster. A method of updating the header section is described with reference to a flowchart of FIG. 18.

The details of each step in FIG. 18 are the same as those in FIG. 11 excepting Step S312 as described below.

More specifically, the file system 105 secures a free cluster for recording a new header section and write information of the new header section on the cluster (S301).

Next, the file system 105 writes, in the FAT entry of the last cluster of a new header section, a value of the next cluster number recorded on the FAT entry of an old header section (S312).

Next, the file system 105 writes a cluster number of the new header section on the top cluster number of the file entry so that the new header section is at the top of the file (S303).

Lastly, the file system 105 writes an unassigned bit stream on the FAT entry corresponding to the old header section to make the header section a free cluster and ends the processing (S304).

FIG. 19 is a diagram for explaining an example of a method of updating a header section in the case where the header section spans plural clusters.

Although the erase blocks 1 to 3 are exemplified in FIG. 19, the details included in each of the erase blocks are not limited.

In the case where a header section spans plural clusters, as shown in this diagram, it may be possible to update, in the header section, only a part of the clusters in which the data to be updated is placed (hereinafter also referred to as "a cluster to be rewritten") and move the part of the clusters to a free cluster.

Figure 20:
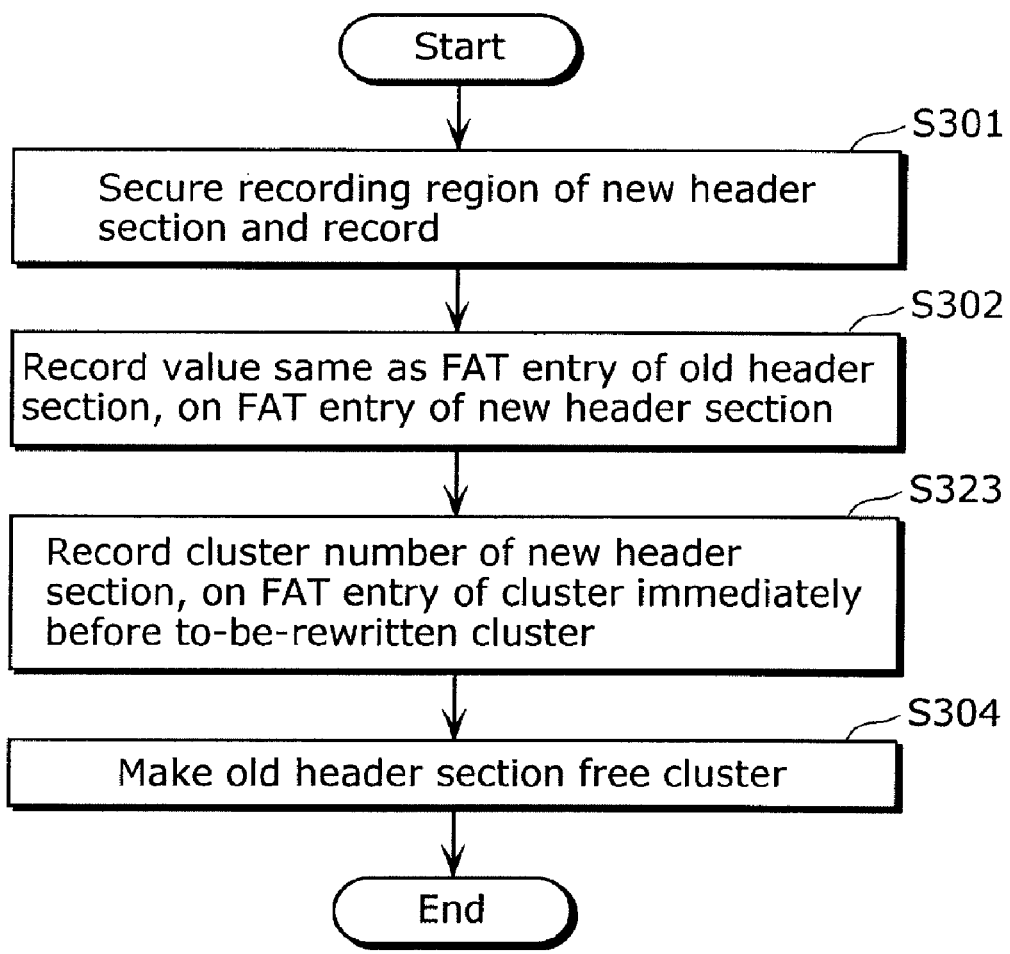
FIG. 20 is a flowchart which shows a procedure for updating a header section in the case where the header section spans plural clusters.

A method of updating the header section is described with reference to a flowchart of FIG. 20. The details of each step in FIG. 20 are the same as those in FIG. 11 excepting Step S323 as described below.

More specifically, the file system 105 secures a free cluster for recording a new header section and write information of the new header section on the cluster (S301).

Next, the file system 105 writes, on the FAT entry of the new header section, a value of the next cluster number recorded on the FAT entry of an old header section (S302).

Next, in the case where the cluster to be rewritten is not at the beginning (the case of being the second from the beginning is exemplified here), the file system 105 writes a cluster number of the new header section on a FAT entry of a cluster immediately before the cluster to be rewritten (S323).

It is to be noted that, with the processing for the FAT entry (S302 and S323), the file management information is corrected so that the data section follows the updated header section.

Lastly, the file system 105 writes an unassigned bit stream on the FAT entry of the old header section to make the header section a free cluster and ends the processing (S304).

Although the case where the cluster to be rewritten is not at the beginning (the case of being the second from the beginning) is exemplified here, FIG. 11 shows a method of updating the header section in the case where the cluster to be rewritten is at the beginning.

In addition, the case where the data to be updated (the Length section, for example) is placed in a single cluster is exemplified, however, in the case where the data to be updated (the Length section, for example) spans plural clusters, it is sufficient to move the plural clusters to a free cluster.

According to the present invention as described above, even in the case where the header section before update spans plural clusters, a new header section is recorded on a single or plural clusters other than the above-described clusters.

More specifically, an updated header section is recorded on one or more clusters in a newly secured block instead of the block that has already been secured. With this, the read-modify-write operation is not carried out, and thus it is possible to perform recording processing at high speed.

In particular, adopting a method of updating a header section as shown in FIG. 19 produces an effective advantage that makes it possible to prevent, as much as possible, unnecessary reading of data irrelevant to rewriting the header section.

It is to be noted that, although it has been explained in the present embodiment as a prerequisite that the header size is an integral multiple of the cluster size, the present invention is not limited to that.

Figure 21:
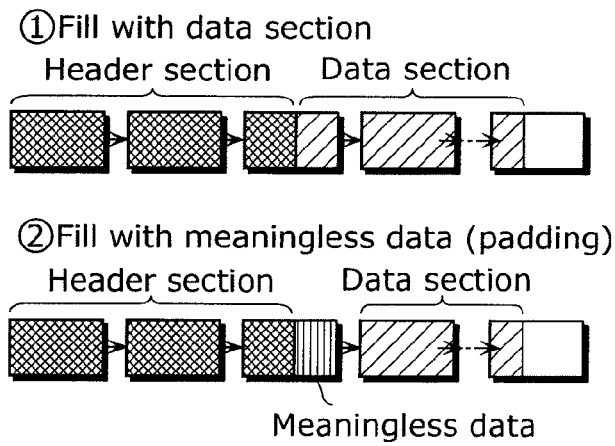
FIG. 21 is an explanatory diagram for processing in the case where a header size is not an integral multiple of a cluster size.

FIG. 21 is an explanatory diagram for processing related to updating a header section in the case where a header size is not an integral multiple of a cluster size.

As shown in this diagram, there are two processing methods for the case where the header size is not an integral multiple of the cluster size.

The first method is a method of filling, with data section, a portion in which a header section is not recorded (hereinafter referred to as "remnant") of regions in a cluster. The second method is a method of filling the remnant with meaningless data such as a padding bit.

In the case where the second method is adopted, the data section is recorded starting from the next cluster. Either method results in a cluster in which data of a header section and data of other than a header section is included, or thus there is a problem of how to process the cluster.

Figure 22:
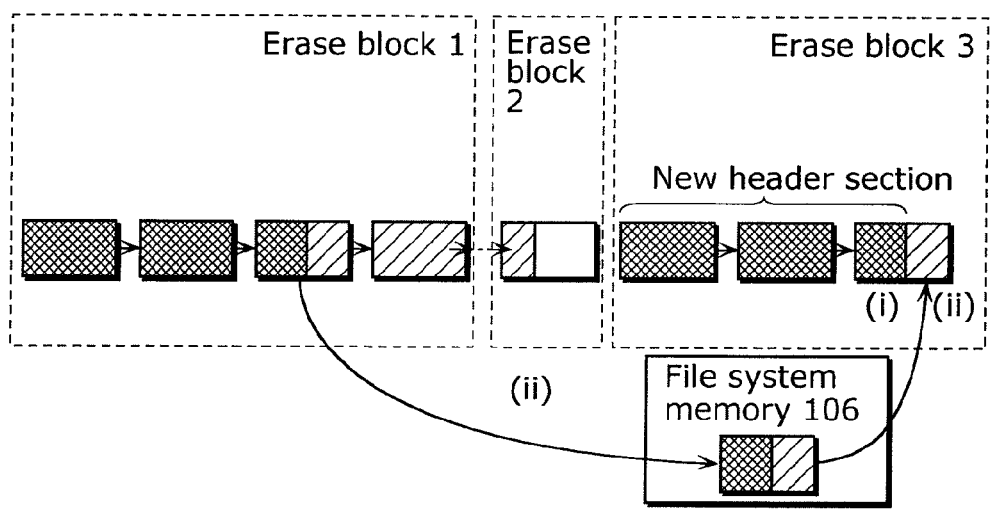
FIG. 22 is a diagram which shows how a cluster that includes both a header section and data other than a header section is processed.
Figure 23:
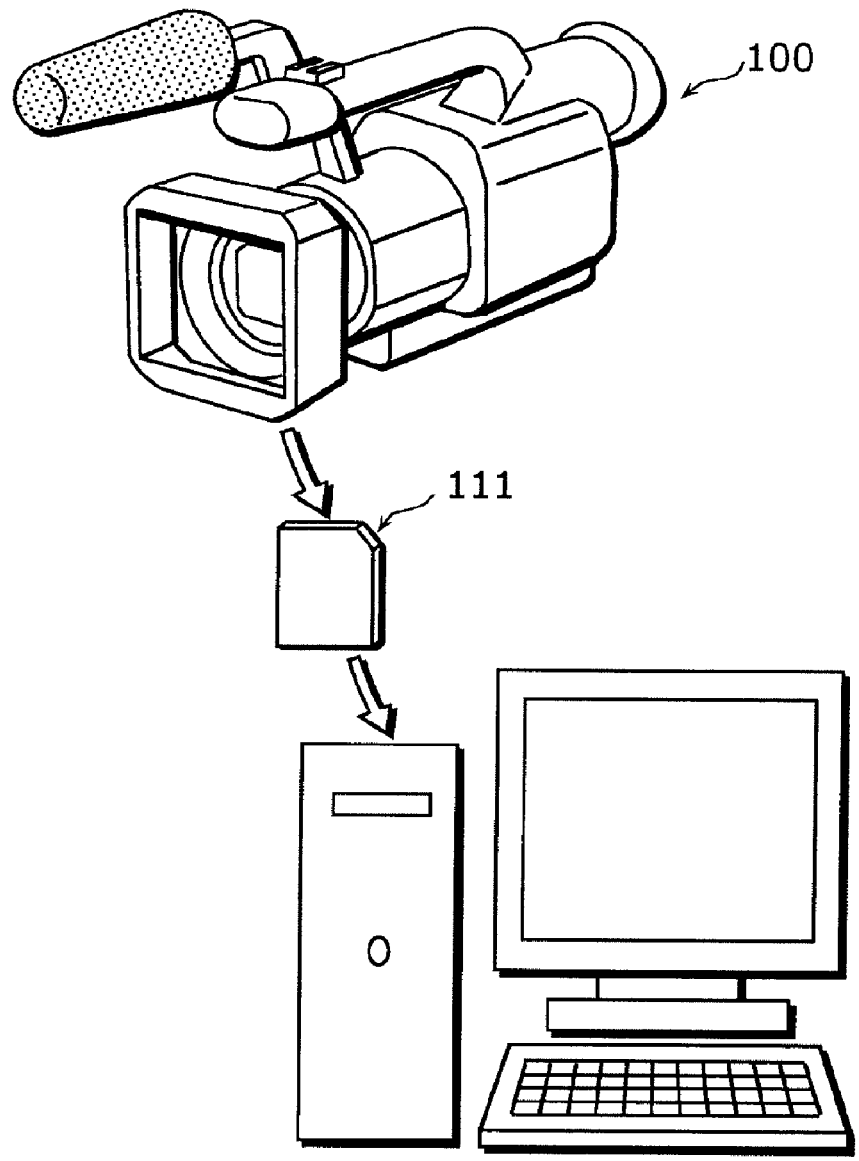
FIG. 23 is an overview of a recording and reproducing apparatus and an editing device according to the embodiment.

FIG. 22 is a diagram which shows how a cluster that includes both a header section and data other than a header section is processed.

There are two methods of processing the data mixed cluster described above. The first method is a method to store data of the header section and data of other than the header section into a file system memory 106 such as a RAM, and then read the data of the header section and the data of other than the header section from the file system memory 106 (see (i) in the diagram).

The second method is a method to read data of the header section and data of other than the header section from a recording memory 111 such as a flash memory (see (ii) in the diagram). The header section read from the file system memory 106 or the recording memory 111 is updated and written into a free cluster as described above.

Although the erase blocks 1 to 3 are exemplified in FIG. 22, the details included in each of the erase blocks are not limited.

As described above, the present invention can also be adopted to the case where the header size is not an integral multiple of the cluster size. Further, although a cluster that includes data of the header section and data of other than the header section is generated in such a case, it is possible to process the data mixed cluster according to the above-described two methods.

It is to be noted that, although the data which the recording and reproducing apparatus 100 records is data including a video and an audio according to the present embodiment, the data may include either one of the video and the audio.

Further, the characteristic of the present invention is described by exemplifying a semiconductor memory as a recording medium in the present embodiment. However, it is apparent that the recording apparatus and the recording method according to the present invention make it possible to produce an effective advantage that information can be recorded while avoiding the read-modify-write operation being carried out even in the case where a recording medium such as optical disk, hard disk, or the like is adopted.

In addition, according to the present embodiment, the header section that has been updated is recorded on a cluster in a block other than the block on which the header section before update is recorded.

However, the header section that has been updated may be recorded on the cluster in the same block as the block on which the header section before update is recorded.

It is assumed, for example, that the recording and reproducing apparatus 100 records accumulated data on a free cluster every time data for one cluster is accumulated, instead of recording data on the recording memory 111 for each 1 MB that is the size of the recording block.

In this case, when a file has the size smaller than 1 MB, the block on which the header section before update is recorded includes a free cluster at the time of the end of recording of the file.

Thus, the header section that has been updated is recorded on the free cluster, and file management information such as a FAT entry is corrected as described with reference to FIG. 11.

This makes it possible to record the file on the recording memory 111 as maintaining a logical file configuration while avoiding a read-modify-write operation being carried out.

Furthermore, although it has been described that a digital video camera converts video signals and the like into a file format and record them on a recording medium in the present embodiment, the present invention is not limited to this and is applicable to other situations.

More specifically, there is a case where a file generated by a digital video camera (the recording and reproducing apparatus 100) is moved to via the recording memory 111 and edited in a personal computer and the like.

The present invention can also be applied to the case where there is a need, for some reason, to update the header section of the file in the editing process. More specifically, the header section is updated while avoiding the read-modify-write operation being carried out by causing a personal computer and the like to execute the recording method according to the present invention.

Further, it should be noted that the present invention can also be realized as a recording program which causes a computer to execute each of the steps described above. Furthermore, the recording program may be recorded on a computer readable recording medium. Any of the following recording media may be used: a semiconductor memory such as a memory card, an optical recording medium such as a CD-R and a DVD, and a magnetooptical medium such as a flexible disk.

It is possible to drive a computer as a control unit of the recording apparatus by reading and executing a recording program from a recording medium on which the recording program to be executed by the computer is recorded.

INDUSTRIAL APPLICABILITY

A recording apparatus and a recording method according to the present invention can update, when updating a header section of a file smaller than a block size, the header section without carrying out a read-modify-write operation. Therefore the recording apparatus and the recording method according to the present invention are useful for an embodiment of a high speed recording on a semiconductor memory and the like.

The invention claimed is:

1. A recording apparatus capable of recording information on a recording medium on a cluster basis, the recording medium having a recording region in which a smallest unit for erasing recorded information is a block, and the cluster being a unit smaller than the block, said recording apparatus comprising:

a reception unit configured to receive a request for starting recording a file and a request for ending recording the file;

a recording unit configured: to record a header section of the file and a data section following the header section, from a beginning of the block in the recording region, in the case where the request for starting recording is received by said reception unit; and to update the header section and record the updated header section on an other cluster different from the cluster on which the header section before update is recorded, in the case where the request for ending recording is received by said reception unit; and a correction unit configured to correct management information indicating a connection order of information recorded on each of the clusters so that the updated header section is followed by the data section, in the case where the updated header section is recorded by said recording unit on the other cluster, the management information being included by the recording medium.

2. The recording apparatus according to claim 1, wherein said recording unit is configured to record the updated header section on the other cluster included in a block different from a block on which the header section before update is recorded, in the case where the request for ending recording is received by said reception unit.

3. The recording apparatus according to claim 1, wherein said recording unit is configured to record the header section before update on a block in the recording region in the case where the request for starting recording is received by said reception unit, the header section before update having a size of an integral multiple of a cluster size.

4. The recording apparatus according to claim 3, wherein said recording unit, in the case where the recorded header section before update spans a plurality of clusters, is configured to record entire information recorded on the plurality of clusters, on plurality of clusters that: are different from the plurality of clusters over which the recorded header section before update spans; and include the other cluster, when the request for ending recording is received by said reception unit.

5. The recording apparatus according to claim 3, wherein said recording unit, in the case where the recorded header section before update spans a plurality of clusters, is configured: to read and update information only from a cluster on which a to-be-updated portion of the header section before update is recorded; and to record the updated information on the other cluster, when the request for ending recording is received by said reception unit.

6. The recording apparatus according to claim 1, wherein said correction unit, in the case where the updated header section is recorded on the other cluster by said recording unit, is further configured to deallocate the cluster on which the header section before update is recorded by correcting the management information so that the management information indicates that the cluster on which the header section before update is recorded is an unused cluster.

7. The recording apparatus according to claim 6, wherein the management information includes a file entry having information specifying the cluster on which the header section before update is recorded, and a file allocation table (FAT) entries indicating the connection order of information, and said correction unit, when correcting the management information, is configured to perform processing in an order of (1) securing a FAT entry corresponding to the other cluster, (2) changing the FAT entry, (3) changing the file entry, and (4) deallocating the cluster on which the header section before update is recorded.

8. The recording apparatus according to claim 1, wherein the recording medium is a nonvolatile semiconductor memory medium.

9. The recording apparatus according to claim 1, wherein said recording unit, in the case where it is detected that recording medium is used up, is further configured to update the header section before update and record the updated header section on the other cluster.

10. A recording method used for an apparatus capable of recording information on a recording medium on a cluster basis, the recording medium having a recording region in which a smallest unit for erasing recorded information is a block, and the cluster being a unit smaller than the block, said recording method comprising:

receiving a request for starting recording a file and a request for ending recording the file;

recording a header section of the file and a data section following the header section, from a beginning of the block in the recording region, in the case where the request for starting recording is received in said receiving, and updating the header section and recording the updated header section on an other cluster different from the cluster on which the header section before update is recorded, in the case where the request for ending recording is received in said receiving; and correcting management information indicating a connection order of information recorded on each of the clusters so that the updated header section is followed by the data section, in the case where the updated header section is recorded on the other cluster in said recording, the management information being included by the recording medium.

11. A program encoded on a non-transitory computer readable recording medium for controlling an apparatus capable of recording information on a recording medium on a cluster basis, the recording medium having a recording region in which a smallest unit for erasing recorded information is a block, and the cluster being a unit smaller than the block, said program causing a computer to execute:

receiving a request for starting recording a file and a request for ending recording the file;

recording a header section of the file and a data section following the header section, from a beginning of the block in the recording region, in the case where the request for starting recording is received in said receiving, and updating the header section and recording the updated header section on an other cluster different from the cluster on which the header section before update is recorded, in the case where the request for ending recording is received in said receiving; and correcting management information indicating a connection order of information recorded on each of the clusters so that the updated header section is followed by the data section, in the case where the updated header section is recorded on the other cluster in said recording, the management information being included by the recording medium.

* * * * *